(12) United States Patent
Kolanek et al.

(10) Patent No.: US 11,313,650 B2
(45) Date of Patent: Apr. 26, 2022

(54) METHODS AND APPARATUSES FOR AERIAL INTERCEPTION OF AERIAL THREATS

(71) Applicant: Northrop Grumman Systems Corporation, Falls Church, VA (US)

(72) Inventors: James Kolanek, Goleta, CA (US); Behshad Baseghi, Santa Barbara, CA (US); David Sharpin, Simi Valley, CA (US); Anthony Visco, Woodland Hills, CA (US); Falin Shieh, Calabasas, CA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 52 days.

(21) Appl. No.: 16/584,378

(22) Filed: Sep. 26, 2019

(65) Prior Publication Data
US 2020/0166311 A1    May 28, 2020

Related U.S. Application Data

(63) Continuation of application No. 15/411,324, filed on Jan. 20, 2017, now Pat. No. 10,436,554, which is a
(Continued)

(51) Int. Cl.
*F41G 7/34* (2006.01)
*F41G 7/00* (2006.01)
(Continued)

(52) U.S. Cl.
CPC .............. *F41G 7/34* (2013.01); *F41G 7/007* (2013.01); *F41G 7/303* (2013.01); *F41H 11/02* (2013.01);
(Continued)

(58) Field of Classification Search
CPC .. G05D 1/12; B64G 1/26; F41G 3/142; F41G 7/301; F41G 7/2213; F41G 7/2206; A63H 27/005; G01S 15/66
See application file for complete search history.

(56) References Cited

U.S. PATENT DOCUMENTS 3,231,223 A    1/1966  Upper
3,350,886 A   11/1967  Adrien et al.
(Continued)

FOREIGN PATENT DOCUMENTS

DE   112005000582 T5   2/2007
EP       0471225 B1    2/1992
(Continued)

OTHER PUBLICATIONS

International Search Report for International Application No. PCT/US2013/074340, dated Mar. 27, 2014, pages.
(Continued)

*Primary Examiner* — Bernarr E Gregory
(74) *Attorney, Agent, or Firm* — TraskBritt

(57) ABSTRACT

Embodiments include active protection systems and methods for an aerial platform. An onboard system includes radar modules, detects aerial vehicles within a threat range of the aerial platform, and determines if any of the aerial vehicles are an aerial threat. The onboard system also determines an intercept vector to the aerial threat, communicates the intercept vector to an eject vehicle, and causes the eject vehicle to be ejected from the aerial platform to intercept the aerial threat. The eject vehicle includes alignment thrusters to rotate a longitudinal axis of the eject vehicle to substantially align with the intercept vector, a rocket motor to accelerate the eject vehicle along an intercept vector, divert thrusters to divert the eject vehicle in a direction substantially perpen-
(Continued)

dicular to the intercept vector, and attitude control thrusters to make adjustments to the attitude of the eject vehicle.

22 Claims, 24 Drawing Sheets

Related U.S. Application Data continuation of application No. 13/839,637, filed on Mar. 15, 2013, now Pat. No. 9,551,552, which is a continuation-in-part of application No. 13/455,831, filed on Apr. 25, 2012, now Pat. No. 9,170,070.

(60) Provisional application No. 61/606,010, filed on Mar. 2, 2012.

(51) Int. Cl.
| | | |
|---|---|---|
| *F41G 7/30* | (2006.01) | |
| *F41H 11/02* | (2006.01) | |
| *F42B 10/56* | (2006.01) | |
| *F42B 15/01* | (2006.01) | |
| *F42B 15/10* | (2006.01) | |
| *G05D 1/08* | (2006.01) | |
| *G06T 7/246* | (2017.01) | |
| *F42B 10/66* | (2006.01) | |
| *F42B 15/00* | (2006.01) | |

(52) U.S. Cl.
CPC ............ *F42B 10/66* (2013.01); *F42B 10/661* (2013.01); *F42B 15/01* (2013.01); *F42B 15/105* (2013.01); *G05D 1/0808* (2013.01); *G06T 7/246* (2017.01)

(56) References Cited

U.S. PATENT DOCUMENTS

| | | | |
|---|---|---|---|
| 3,612,442 A | 10/1971 | Chisel | |
| 3,614,027 A | 10/1971 | Lewis | |
| 3,624,367 A | 11/1971 | Hamilton et al. | |
| 3,667,044 A | 5/1972 | Vaughan et al. | |
| 3,693,909 A | 9/1972 | Hall | |
| 3,732,693 A | 5/1973 | Chu | |
| 3,735,944 A | 5/1973 | Bannett et al. | |
| 3,788,069 A | 1/1974 | Schmidt | |
| 3,802,190 A | 4/1974 | Kaufmann | |
| 3,808,940 A | 5/1974 | Schillreff et al. | |
| 3,841,585 A * | 10/1974 | Evers-Euterneck | ........................ F41G 7/2213 244/3.15 |
| 3,926,390 A | 12/1975 | Teuber et al. | |
| 4,008,869 A * | 2/1977 | Weiss | ............ F41G 3/142 244/3.13 |
| 4,063,485 A | 12/1977 | Carter et al. | |
| 4,093,153 A | 6/1978 | Bardash et al. | |
| 4,332,360 A | 6/1982 | Topliffe | |
| 4,408,735 A | 10/1983 | Metz | |
| 4,470,562 A | 9/1984 | Hall et al. | |
| 4,482,107 A | 11/1984 | Metz | |
| 4,568,940 A | 2/1986 | Diamond | |
| 4,635,880 A * | 1/1987 | Jehle | ............ F41G 7/301 244/3.14 |
| 4,762,293 A | 8/1988 | Waddington | |
| 4,848,706 A | 7/1989 | Garg et al. | |
| 4,925,129 A | 5/1990 | Salkeld et al. | |
| 4,967,982 A | 11/1990 | Bagley | |
| 5,054,712 A | 10/1991 | Bar et al. | |
| 5,062,593 A | 11/1991 | Goddard et al. | |
| 5,071,087 A | 12/1991 | Gray | |
| 5,082,200 A * | 1/1992 | Gray | ................ G05D 1/12 244/3.15 |
| 5,114,094 A | 5/1992 | Harris | |
| 5,118,050 A | 6/1992 | Arnold et al. | |
| 5,129,604 A | 7/1992 | Bagley | |
| 5,238,204 A | 8/1993 | Metz | |
| 5,259,569 A | 11/1993 | Waymeyer et al. | |
| 5,379,966 A * | 1/1995 | Simeone | ................ F41G 7/303 244/3.11 |
| 5,456,425 A | 10/1995 | Morris et al. | |
| 5,456,429 A | 10/1995 | Mayersak | |
| 5,478,028 A | 12/1995 | Snyder | |
| 5,533,331 A * | 7/1996 | Campbell | ................ B64G 1/26 60/204 |
| 5,631,830 A | 5/1997 | Schroeder | |
| 5,828,571 A * | 10/1998 | Bessacini | ................ G01S 15/66 701/23 |
| 5,855,339 A | 1/1999 | Mead et al. | |
| 5,917,442 A | 6/1999 | Manoogian | |
| 6,135,393 A | 10/2000 | Sackheim et al. | |
| 6,179,246 B1 * | 1/2001 | Fisel | ..................... F41G 7/2213 244/3.15 |
| 6,209,820 B1 * | 4/2001 | Golan | ................... F41G 7/2206 244/3.1 |
| 6,231,002 B1 | 5/2001 | Hibma et al. | |
| 6,231,003 B1 | 5/2001 | Hibma et al. | |
| 6,267,326 B1 | 7/2001 | Smith et al. | |
| RE37,331 E | 8/2001 | Schroeder | |
| 6,289,669 B1 | 9/2001 | Smirra | |
| 6,347,763 B1 | 2/2002 | Harkins et al. | |
| 6,360,986 B1 * | 3/2002 | Larcher | ................ F41G 7/2213 244/3.15 |
| 6,455,828 B1 * | 9/2002 | Gauggel | ............... F41G 7/2206 244/3.1 |
| 6,565,036 B1 | 5/2003 | Palathingal et al. | |
| 6,588,700 B2 | 7/2003 | Moore et al. | |
| 6,603,421 B1 | 8/2003 | Schiff et al. | |
| 6,610,971 B1 | 8/2003 | Crabtree | |
| 6,629,668 B1 | 10/2003 | Grau et al. | |
| 6,630,902 B1 | 10/2003 | Fenton et al. | |
| 6,672,533 B1 * | 1/2004 | Regebro | ................. F41G 7/301 244/3.11 |
| 6,717,543 B2 | 4/2004 | Pappert et al. | |
| 6,889,935 B2 | 5/2005 | O'Dwyer | |
| 6,920,827 B2 | 7/2005 | Llyod | |
| 6,926,576 B1 * | 8/2005 | Alway | ................. A63H 27/005 446/34 |
| 7,004,423 B2 | 2/2006 | Folsom et al. | |
| 7,102,113 B2 | 9/2006 | Fujita et al. | |
| 7,239,377 B2 | 7/2007 | Vermillion et al. | |
| 7,269,920 B2 | 9/2007 | Staley, III | |
| 7,277,046 B2 | 10/2007 | Adams et al. | |
| 7,287,725 B2 | 10/2007 | Chasman et al. | |
| 7,416,154 B2 | 8/2008 | Bittle et al. | |
| 7,494,089 B2 | 2/2009 | Williams et al. | |
| 7,654,185 B1 | 2/2010 | Yannone | |
| 7,658,031 B2 | 2/2010 | Cross et al. | |
| 7,714,261 B2 | 5/2010 | Bnayahu et al. | |
| 7,832,137 B2 | 11/2010 | Sammut et al. | |
| 7,851,732 B2 | 12/2010 | Brinkerhoff et al. | |
| 7,875,838 B1 | 1/2011 | Starken | |
| 7,886,646 B2 | 2/2011 | Bannasch et al. | |
| 7,899,644 B2 | 3/2011 | Weber et al. | |
| 7,977,614 B2 | 7/2011 | Raviv | |
| 7,989,743 B2 | 8/2011 | Brinkerhoff et al. | |
| 8,020,482 B1 | 9/2011 | McCants, Jr. | |
| 8,084,724 B1 | 12/2011 | Brosch et al. | |
| 8,084,725 B1 | 12/2011 | Dryer | |
| 8,084,726 B2 | 12/2011 | Hanlon et al. | |
| 8,089,033 B2 | 1/2012 | Zank et al. | |
| 8,157,169 B2 | 4/2012 | Olden et al. | |
| 8,173,946 B1 | 5/2012 | Patterson et al. | |
| 8,242,422 B2 | 8/2012 | Olden et al. | |
| 8,338,768 B2 | 12/2012 | Hanlon et al. | |
| 8,423,336 B2 | 4/2013 | Bennett et al. | |
| 8,436,283 B1 | 5/2013 | Tournes et al. | |
| 8,464,949 B2 | 6/2013 | Namey et al. | |
| 8,575,526 B1 | 11/2013 | Colvin et al. | |
| 8,584,443 B1 | 11/2013 | Carlson | |
| 8,735,788 B2 | 5/2014 | Preston et al. | |
| 8,757,486 B2 | 6/2014 | Cook et al. | |

(56) References Cited

U.S. PATENT DOCUMENTS

| | | | |
|---|---|---|---|
| 8,800,913 B2 * | 8/2014 | Pagliara | F42B 10/66 244/52 |
| 8,809,755 B1 | 8/2014 | Patel et al. | |
| 9,170,070 B2 | 10/2015 | Sharpin et al. | |
| 9,501,055 B2 | 11/2016 | Kolanek et al. | |
| 10,295,312 B2 | 5/2019 | Sharpin et al. | |
| 2003/0210170 A1 | 11/2003 | Krikorian et al. | |
| 2005/0103925 A1 | 5/2005 | Folsom et al. | |
| 2005/0184192 A1 | 8/2005 | Schneider | |
| 2006/0238403 A1 | 10/2006 | Golan et al. | |
| 2006/0283317 A1 | 12/2006 | Melnychuk et al. | |
| 2007/0169616 A1 | 7/2007 | Vickroy | |
| 2009/0001214 A1 | 1/2009 | Williams et al. | |
| 2010/0026554 A1 | 2/2010 | Longman et al. | |
| 2010/0162915 A1 | 7/2010 | Rastegar | |
| 2010/0275576 A1 | 11/2010 | Gutman et al. | |
| 2010/0282892 A1 | 11/2010 | Hanlon et al. | |
| 2010/0313741 A1 | 12/2010 | Smogitel | |
| 2011/0029160 A1 * | 2/2011 | Pagliara | F42B 10/66 701/4 |
| 2011/0049289 A1 | 3/2011 | Kinsey et al. | |
| 2011/0082604 A1 | 4/2011 | Lam | |
| 2011/0101097 A1 | 5/2011 | Olden et al. | |
| 2011/0120294 A1 | 5/2011 | Beach et al. | |
| 2011/0127328 A1 | 6/2011 | Warren | |
| 2011/0196551 A1 | 8/2011 | Lees et al. | |
| 2012/0091252 A1 | 4/2012 | Zaetterqvist | |
| 2012/0199690 A1 | 8/2012 | Rastegar et al. | |
| 2012/0248237 A1 | 10/2012 | Dolphin | |
| 2014/0138474 A1 | 5/2014 | Sharpin et al. | |
| 2014/0303884 A1 | 10/2014 | Levien et al. | |

FOREIGN PATENT DOCUMENTS

| | | | |
|---|---|---|---|
| EP | 0418636 B1 | 12/1993 | |
| EP | 2624011 A1 | 8/2013 | |
| FR | 2444253 A3 | 7/1980 | |
| FR | 2674621 A1 * | 10/1992 | ............ F42B 10/661 |
| GB | 2265342 A | 9/1993 | |
| JP | 07-334244 A | 12/1995 | |
| JP | 2005-155953 A | 6/2005 | |
| JP | 5491877 B2 | 5/2014 | |
| WO | 03/94292 A1 | 11/2003 | |
| WO | 2005/098346 A1 | 10/2005 | |
| WO | 2006/079029 A2 | 7/2006 | |
| WO | 2008/035338 A2 | 3/2008 | |
| WO | 2009/045573 A1 | 4/2009 | |
| WO | 2010/036418 A2 | 4/2010 | |
| WO | 2010/147520 A1 | 12/2010 | |
| WO | 2011/028304 A1 | 3/2011 | |

OTHER PUBLICATIONS

Written Opinion of the International Searching Authority, ISA/EP, for Application No. PCT/US2013/074340, dated Mar. 27, 2014, 6 pages.

International Search Report for Application No. PCT/US2014/023109, dated Oct. 16, 2014, 4 pages.

Written Opinion of the International Searching Authority, ISA/EP, for Application No. PCT/US2014/023109, dated Oct. 16, 2014, 7 pages.

International Search Report for International Application No. PCT/US2013/027898, dated Jun. 5, 2013, 5 pages.

Written Opinion of the International Search Authority, ISA/EP, for Application No. PCT/US2013/027898, dated Jun. 5, 2013, 6 pages.

* cited by examiner

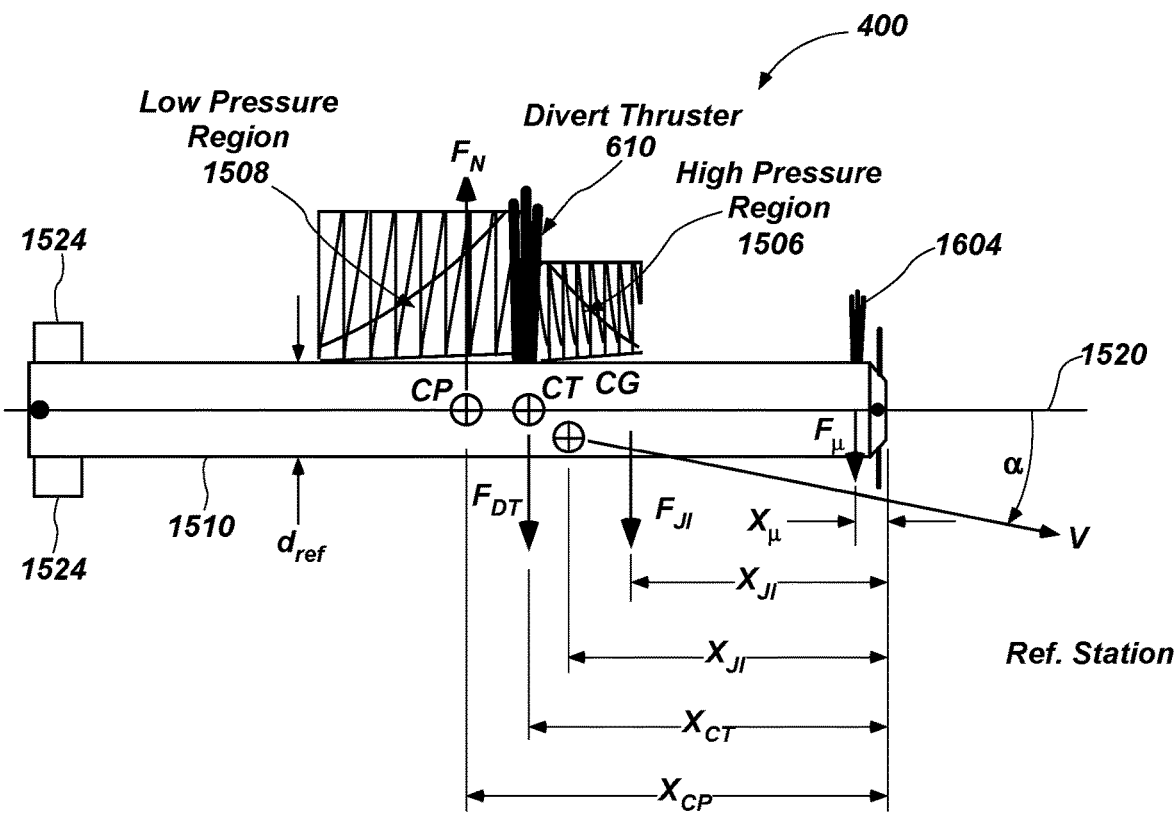
FIG. 15
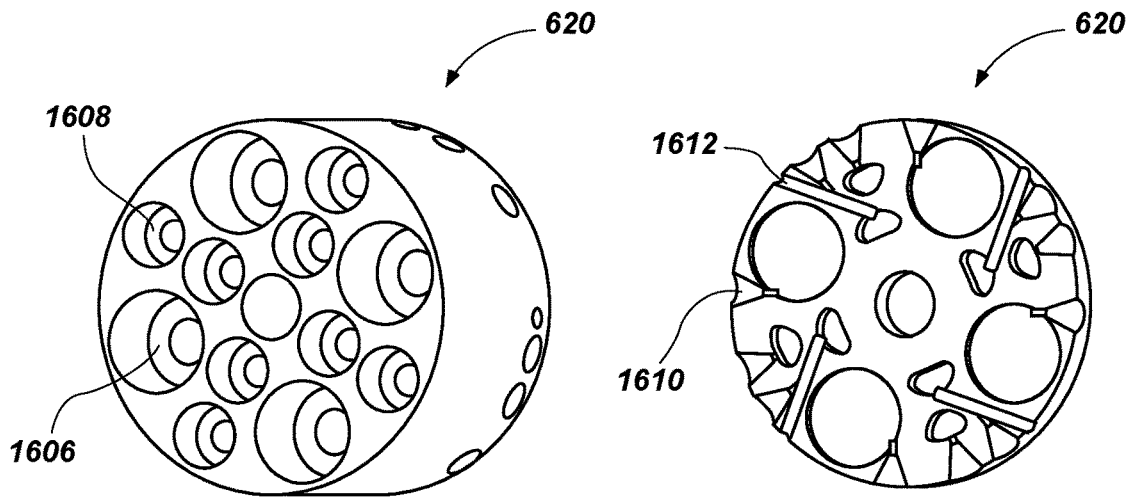
FIG. 16A  FIG. 16B

METHODS AND APPARATUSES FOR AERIAL INTERCEPTION OF AERIAL THREATS

CROSS-REFERENCE TO RELATED APPLICATIONS

This application is a continuation of U.S. patent application Ser. No. 15/411,324, filed Jan. 20, 2017, now U.S. Pat. No. 10,436,554, issued Oct. 8, 2019, which is a continuation of U.S. patent application Ser. No. 13/839,637, filed Mar. 15, 2013, now U.S. Pat. No. 9,551,552, issued Jan. 24, 2017, which is a continuation-in-part of U.S. patent application Ser. No. 13/455,831, filed Apr. 25, 2012, now U.S. Pat. No. 9,170,070, issued Oct. 27, 2015, which claims priority to U.S. Provisional Patent Application Ser. No. 61/606,010, filed Mar. 2, 2012, the disclosure of each of which is hereby incorporated herein in its entirety by this reference. This application is also related to U.S. patent application Ser. No. 13/839,176, filed Mar. 15, 2013, now U.S. Pat. No. 9,501,055, issued Nov. 22, 2016, and titled "Methods and Apparatuses for Engagement Management of Aerial Threats," the disclosure of each of which is hereby incorporated herein in its entirety by this reference.

TECHNICAL FIELD

Embodiments of the present disclosure relate generally to methods and apparatuses for engagement management relative to a threat and, more particularly, to aerial interception of aerial threats.

BACKGROUND

Rocket-propelled grenades (RPGs) and other human carried projectiles such as man-portable air-defense systems (MANPADS or MPADS) and shoulder-launched surface-to-air missiles (SAMs) represent serious threats to mobile land and aerial platforms. Even inexperienced RPG operators can engage a stationary target effectively from 150-300 meters, while experienced users could kill a target at up to 500 meters, and moving targets at 300 meters. One known way of protecting a platform against RPGs is often referred to as active protection and generally causes explosion or discharge of a warhead on the RPG at a safe distance away from the threatened platform. Other known protection approaches against RPGs and short-range missiles are more passive and generally employ fitting the platform to be protected with armor (e.g., reactive armor, hybrid armor or slat armor).

Active protection systems (APS) have been proposed for ground vehicles for defense against RPGs and other rocket fired devices with a good success rate for quite some time. However, these systems are proposed to protect vehicles that are: 1) armored, 2) can carry heavy loads, and 3) have plenty of available space for incorporation of large critical systems. Currently these systems can weigh anywhere between 300 to 3000 lbs. and can protect the vehicle when intercepting incoming threats as close as 5 to 10 ft.

There is a need in the art for engagement management systems that can work in cooperation with intercept vehicles to engage and destroy aerial threats. There is also a need for such systems to be portable and lightweight enough for carrying on aerial and other mobile platforms that may have significant weight and size constraints, or on which an active protection system may be easily installed. There is also a need for such systems to coordinate with multiple engagements of aerial threats, intercept vehicles, and other nearby engagement management systems.

BRIEF DESCRIPTION OF THE DRAWINGS

FIG. 15 is a simplified side view of a kill vehicle illustrating the principle forces of interest on the kill vehicle;

FIGS. 16A and 16B illustrate a nose thruster module;

DETAILED DESCRIPTION

Figures 1A, 1B:
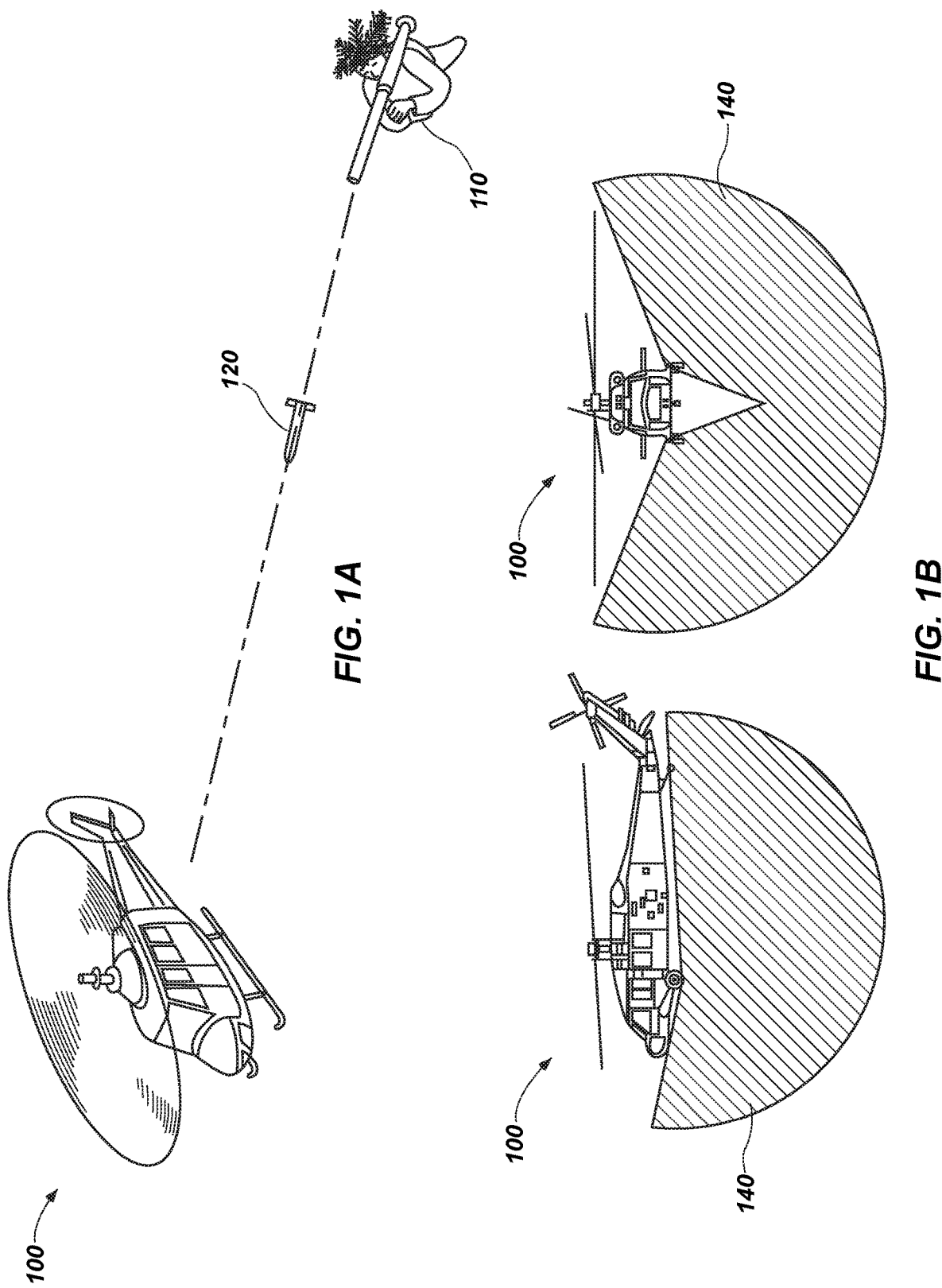
FIGS. 1A and 1B illustrate a helicopter as an aerial platform that may be under attack from an aerial threat and coverage areas that may be employed to sense when such a threat is present.

In the following description, reference is made to the accompanying drawings in which is shown, by way of illustration, specific embodiments of the present disclosure. The embodiments are intended to describe aspects of the disclosure in sufficient detail to enable those skilled in the art to practice the invention. Other embodiments may be utilized and changes may be made without departing from the scope of the disclosure. The following detailed description is not to be taken in a limiting sense, and the scope of the present invention is defined only by the appended claims.

Furthermore, specific implementations shown and described are only examples and should not be construed as the only way to implement or partition the present disclosure into functional elements unless specified otherwise herein. It will be readily apparent to one of ordinary skill in the art that the various embodiments of the present disclosure may be practiced by numerous other partitioning solutions.

In the following description, elements, circuits, and functions may be shown in block diagram form in order not to obscure the present disclosure in unnecessary detail. Additionally, block definitions and partitioning of logic between various blocks is exemplary of a specific implementation. It will be readily apparent to one of ordinary skill in the art that the present disclosure may be practiced by numerous other partitioning solutions. Those of ordinary skill in the art would understand that information and signals may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof. Some drawings may illustrate signals as a single signal for clarity of presentation and description. It will be understood by a person of ordinary skill in the art that the signal may represent a bus of signals, wherein the bus may have a variety of bit widths and the present disclosure may be implemented on any number of data signals including a single data signal.

The various illustrative logical blocks, modules, and circuits described in connection with the embodiments disclosed herein may be implemented or performed with a general-purpose processor, a special-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A general-purpose processor may be considered a special-purpose processor while the general-purpose processor is configured to execute instructions (e.g., software code) stored on a computer-readable medium. A processor may also be implemented as a combination of computing devices, such as a combination of a DSP and a microprocessor, a plurality of microprocessors, one or more microprocessors in conjunction with a DSP core, or any other such configuration.

In addition, it is noted that the embodiments may be described in terms of a process that may be depicted as a flowchart, a flow diagram, a structure diagram, or a block diagram. Although a process may describe operational acts as a sequential process, many of these acts can be performed in another sequence, in parallel, or substantially concurrently. In addition, the order of the acts may be rearranged.

Figure 3:
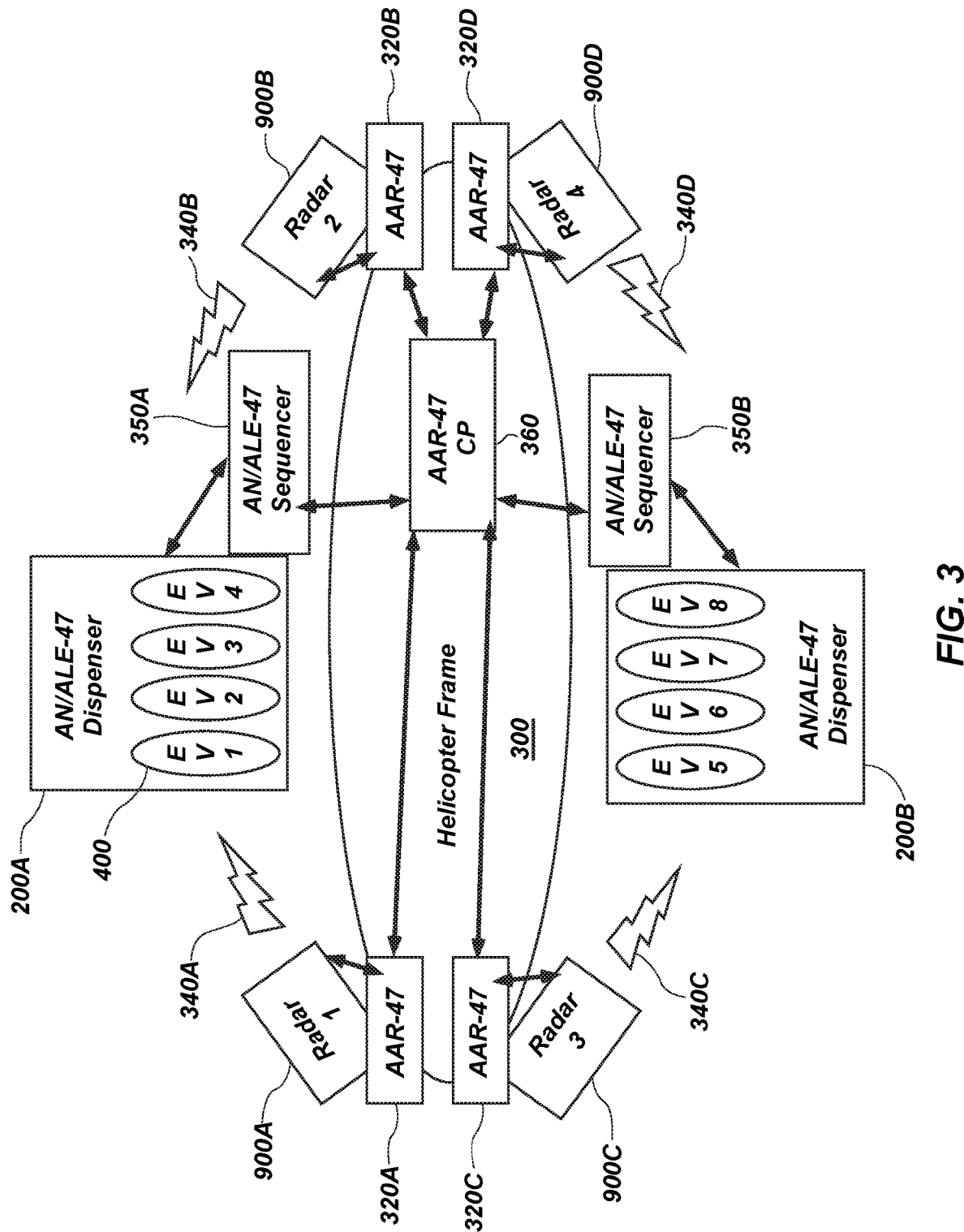
FIG. 3 illustrates systems that may be present on a helicopter and that may intercommunicate according to one or more embodiments of the present disclosure.

Elements described herein may include multiple instances of the same element. These elements may be generically indicated by a numerical designator (e.g., 110) and specifically indicated by the numerical indicator followed by an alphabetic designator (e.g., 110A) or a numeric indicator preceded by a "dash" (e.g., 110-1). For ease of following the description, for the most part, element number indicators begin with the number of the drawing on which the elements are introduced or most fully discussed. For example, where feasible, elements in FIG. 3 are designated with a format of 3xx, where 3 indicates FIG. 3 and xx designates the unique element.

It should be understood that any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed or that the first element must precede the second element in some manner. In addition, unless stated otherwise, a set of elements may comprise one or more elements.

Embodiments of the present disclosure include apparatuses and methods for providing protection for mobile platforms, such as, for example, a helicopter, from an aerial threat. Some embodiments of the present disclosure may include methods and apparatuses that are portable and lightweight enough for carrying on aerial platforms that may have significant weight and size constraints. Some embodiments of the present disclosure may include methods and apparatuses that can be incorporated into existing systems already installed on aerial platforms.

FIGS. 1A and 1B illustrate a helicopter as an aerial platform 100 that may be under attack from an aerial threat 120 and coverage areas 140 that may be employed to sense when such a threat is present within an intercept range (may also be referred to herein as a threat range) of embodiments of the present disclosure. As shown in FIG. 1A, the aerial threat 120 may be shot by an attacker 110 toward the aerial platform 100.

As used herein, "aerial threat" or "threat" are used interchangeably to refer to any threat directed toward a mobile platform, including projectiles, rockets, and missiles that may be shoulder launched or launched from other platforms. As non-limiting examples, such aerial threats include rocket-propelled grenades (RPGs), man-portable air-defense systems (MANPADS or MPADS), shoulder-launched surface-to-air missiles (SAMs), tube-launched, optically tracked, wire-guided missiles (TOWs), and other aerial weapons, having a trajectory and ordnance such that they may cause damage to the mobile platform.

The term "aerial platform" includes, but is not limited to, platforms such as helicopters, unmanned airborne vehicles (UAVs), remotely piloted vehicles (RPVs), light aircraft, hovering platforms, and low speed traveling platforms. The protection systems and methods of the present disclosure are particularly useful for protecting aerial platforms against many kinds of aerial threats.

While embodiments of the present disclosure may be particularly suitable for use on aerial platforms 100 due to the small size and weight, they may also be used in other types of mobile platforms like ground-based mobile platforms such as, for example, tanks, armored personnel carriers, personnel carriers (e.g., Humvee and Stryker vehicles) and other mobile platforms capable of bearing embodiments of the present disclosure. Moreover, embodiments of the present disclosure may be used for relatively stationary ground-based personnel protection wherein a mobile platform may not be involved. Accordingly, embodiments of the disclosure are not limited to aerial applications.

FIG. 1B illustrates coverage areas 140 in which one or more embodiments of the present disclosure may detect an incoming aerial threat 120 and perform active countermeasures using one or more embodiments of the present invention to remove the aerial threat 120 before it can damage the aerial platform 100. Some embodiments of the present disclosure may be configured such that they can be disposed in previously existing countermeasures dispenser systems (CMDS).

Figure 2A:
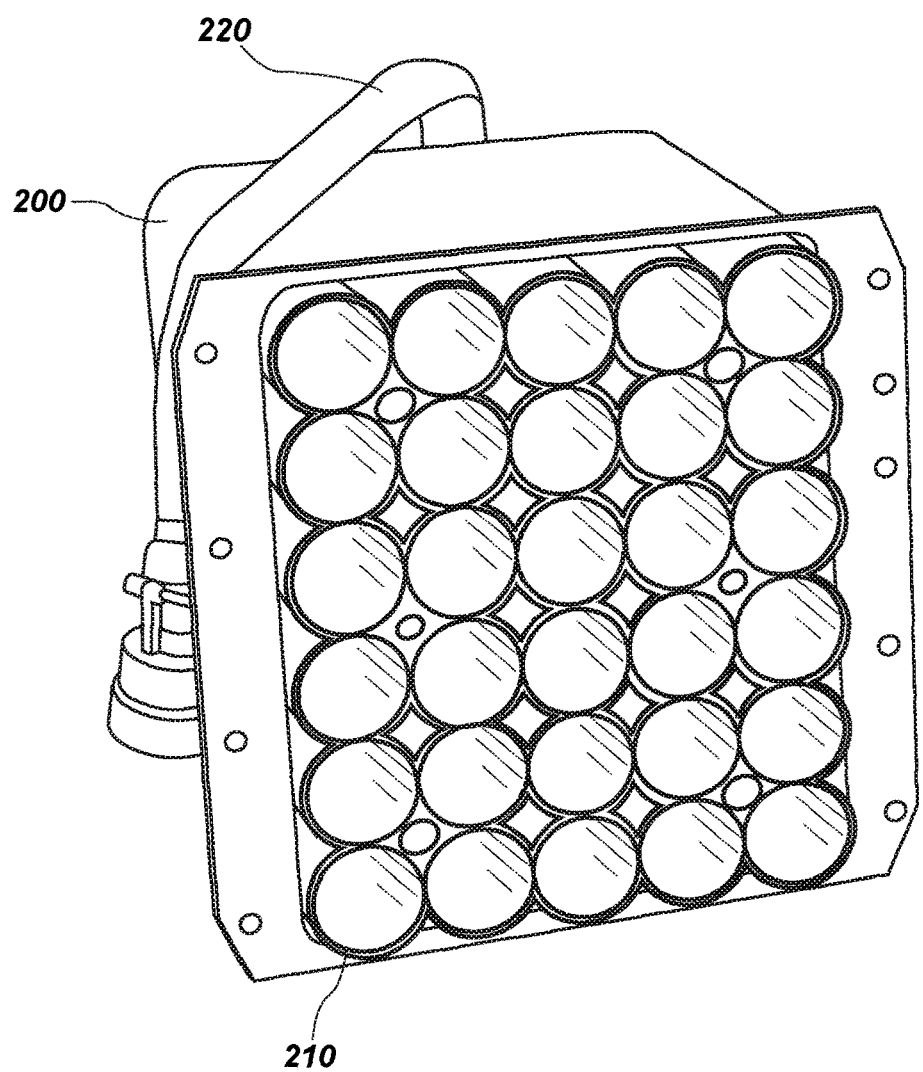
FIGS. 2A and 2B illustrate a conventional dispenser in which an eject vehicle (EV) according to one or more embodiments of the present disclosure may be placed.
Figure 2B:
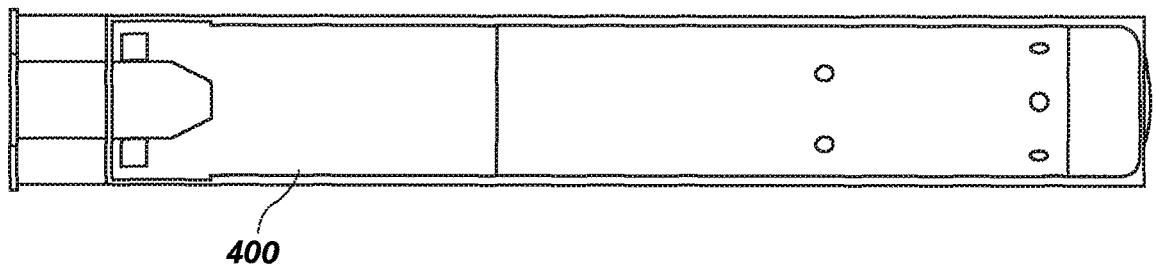

FIGS. 2A and 2B illustrate a dispenser 200 configured as a conventional CMDS (e.g., an AN/ALE-47) in which an eject vehicle 400 (EV) according to one or more embodiments of the present disclosure may be placed. AN/ALE-47 dispensers are conventionally used to dispense passive countermeasures, such as, for example, radar-reflecting chaff, infrared countermeasures to confuse heat-seeking missile guidance, and disposable radar transmitters. With some embodiments of the present disclosure, eject vehicles 400 may also be placed in the AN/ALE-47 and ejected therefrom under control of the AN/ALE-47 and other electronics on the aerial platform 100 (FIGS. 1A and 1B). The eject vehicle 400 may be configured as a substantially cylindrical vehicle to be placed in a tubular dispenser 210 and ejection may be controlled from control wiring 220 connected to the dispenser 200. Moreover, the dispenser 200 may be configured to hold both the passive countermeasures for which it was originally designed, as well as one or more eject vehicles 400 according to embodiments of the present disclosure.

While some embodiments of the eject vehicle 400 may be configured to be disposed in an AN/ALE-47, other types of dispensers 200 or other types of carriers for the eject vehicle 400 may also be used. Moreover, the tubular dispenser 210 is illustrated with a circular cross section. However, other cross sections may be used, such as, for example, square, hexagonal, or octagonal.

FIG. 3 illustrates systems that may be present on a helicopter frame 300 and that may intercommunicate according to one or more embodiments of the present disclosure. The helicopter frame 300 and systems described are used as specific examples to assist in giving details about embodiments of the present disclosure. In the specific example of FIG. 3, an AAR-47 missile approach warning system (MAWS) warns of threat missile approaches by detecting radiation associated with the missile. In the specific example, four MAWSs (320A, 320B, 320C, and 320D) are disposed near four corners of the helicopter frame 300. A central processor 360 may be used to control and coordinate the four MAWSs (320A, 320B, 320C, and 320D).

Two AN/ALE-47 dispensers (200A and 200B) are positioned on outboard sides of the helicopter frame 300, each of which may contain one or more eject vehicles 400. As shown in FIG. 3, there are four eject vehicles 400 on each side labeled EV1 through EV4 on one side and labeled EV5-EV8 on the other side. The AN/ALE-47 dispensers (200A and 200B) are each controlled by an AN/ALE-47 sequencer (350A and 350B), which are, in turn, controlled by the central processor 360.

According to one or more embodiments of the present disclosure four radar modules (900A, 900B, 900C, and 900D) are included to augment and connect with the AAR-47s and communicate with the eject vehicles 400. These radar modules 900 (see FIG. 9A) are configured to detect and track relatively small incoming aerial threats (e.g., an RPG) as well as the outgoing eject vehicles 400. Moreover, the radar modules 900 can send wireless communications (340A, 340B, 340C, and 340D) to the eject vehicles 400 both before and after they are ejected from the dispensers (200A and 200B). The radar modules 900, and eject vehicles 400 may each include unique identifiers, such as, for example, a media access control (MAC) address. The radar modules 900 may also be configured to detect, track, and communicate with other friendly platforms such as, for example, other helicopters flying in formation with the helicopter. Thus, all helicopters within communication range can communicate and share radar and control information to form a broad coverage area, similar to cellular telephone base station coverage. Moreover, and as explained more fully below, the helicopters may communicate to define different sector coverage areas such that one helicopter does not launch an eject vehicle 400 into a sector that may damage or interfere with another helicopter.

The control processors, such as the central processor 360, the MAWSs 320, the radar modules 900, the sequencers 350, and the dispensers 200 may be configured to form an ad hoc network and include the eject vehicles 400.

The specific example of FIG. 3 is shown to illustrate how radar modules (900A-900D) and eject vehicles (EV1-EV8) of the present disclosure can be incorporated with existing systems on helicopter platforms with little change. Of course, other systems may be employed with embodiments of the present disclosure. As a non-limiting example, one radar module 900A may be positioned on one side of the helicopter frame 300 and another radar module 900C may be positioned on another side of the helicopter frame. In such a case, the radar modules 900 would be configured to provide hemispherical coverage areas. These radar modules 900 may be controlled by, communicate with, or a combination thereof, a different central processor 360 configured specifically for embodiments of the present disclosure. Moreover, the eject vehicles 400 may be disposed in different carriers or different dispensers from the AN/ALE-47 dispensers (200A and 200B) shown in FIG. 3.

When embodiments of the present disclosure are used as illustrated in FIG. 3, they provide an ultra-lightweight active protection system for helicopter platforms that may increase the survivability against RPG attacks to better than 90% for RPGs fired from ranges as close as about 100 meters away.

In order to satisfy the helicopter platform constraints, embodiments of the present disclosure address many significant technology areas:

1) For helicopter applications, size, weight, and power should be considered. Every pound of added airframe equipment will reduce capacity to carry personnel or cargo, and the space for adding equipment to the airframe may be at a premium. At least some embodiments of the present disclosure are configured to be less than about 50 pounds and occupy about 5.5 inches×5.5 inches surface area at each of the four corners of a helicopter exterior shell and with minimal impact to existing wiring kits.

2) Helicopters generally do not carry armor and thus, the intercept of an incoming threat (e.g., an RPG) must occur at a range that is safe to the un-armored helicopter airframe. Using an RPG-7 as an example, to achieve a survival probability of about 99% from the blast alone, the intercept should occur at distances beyond 30 meters from the helicopter shell. This requirement significantly influences the system response time, when considering that an RPG fired at a 100-meter distance may impact the helicopter in less than about 600 milliseconds.

3) A third concern is fratricide and collateral damage to friendly forces that may be amplified by the helicopter platform deploying kinetic countermeasures in a position above ground and potentially next to a wingman helicopter or in the vicinity of civilians, friendly troops, or a combination thereof. Some embodiments of the present disclosure are configured to work in combination with embodiments on other helicopters when the helicopters are flying in formation relatively close to each other.

4) Some embodiments of the present disclosure can geo-locate the attacker 110 (FIG. 1A) after a few radar track frames are processed.

5) Embodiments of the present disclosure can engage multiple threats at a time. In other words, multiple incoming aerial threats 120 can be detected and tracked and multiple outgoing eject vehicles 400 can be tracked. In addition, to increase a probability of destroying an incoming aerial threat 120, multiple eject vehicles 400 may be launched, directed toward, and detonated proximate the same aerial threat 120.

6) Finally, eject vehicles 400 can be launched and guided to the point of attack with the same or different warheads and detonated above the threat point of origin.

To address these technology areas, some embodiments of the present disclosure include an active kinetic countermeasure projectile (i.e., the eject vehicle 400 of FIG. 2B), including an ejection mechanism with an impulse charge that can fit in, and can be launched by, the AN/ALE-47 chaff/flare dispenser 200. Some embodiments of the present disclosure include the radar module 900 covering a 90-degree sector or more (i.e., with a 90-degree sector, each helicopter platform would use four radar modules 900).

When referring to the radar module 900 herein (e.g., as shown in FIG. 3), it should be understood that in some embodiments the radar module 900 may perform the operations described herein in combination with other electronics and processors on the aerial platform 100. As such, the radar modules 900 may be used to: 1) search, acquire, and track incoming aerial threats 120, 2) launch the active kinetic countermeasure (i.e., eject vehicle 400), 3) track the outgoing eject vehicle 400 with respect to the incoming aerial threat 120, 4) point and guide the eject vehicle 400 toward the incoming aerial threat 120, 5) command detonate the eject vehicle 400, and 6) geo-locate the attacker 110, all in less than about one second. In one configuration, at least two AN/ALE-47 dispensers 200 would be used in conjunction with the four radar modules 900 such that each dispenser 200 provides hemispherical coverage.

The radar modules 900 may be configured as pulse Doppler radar modules 900 to scan the azimuth plane and the elevation plane using two orthogonal fan beams and may be configured to cover a 90-degree sector in about 20 milliseconds. Upon detecting an incoming aerial threat 120, the associated radar module 900 may then direct the launch and guidance of an eject vehicle 400 from an AN/ALE-47 dispenser 200 that covers that sector. The eject vehicle 400 may be command guided to the target by the radar module 900 and command detonated. The radar modules 900 may be configured as an addition to the existing AN/AAR-47 system and may use its existing interface for launching of the eject vehicle 400.

Some of the embodiments of the present disclosure may be configured to deploy an eject vehicle 400 that fits in a standard dispenser 200 but could be stabilized and pointed towards the threat after launch, in less than about 50 milliseconds, in the rotor downwash of a helicopter, and when ejected in the fixed direction dictated by the dispenser 200. The radar modules 900 may then guide the eject vehicle 400 to accurately intercept the aerial threat 120 within about 330 milliseconds and thus reduce the requirement of carrying a large warhead.

Figure 4:
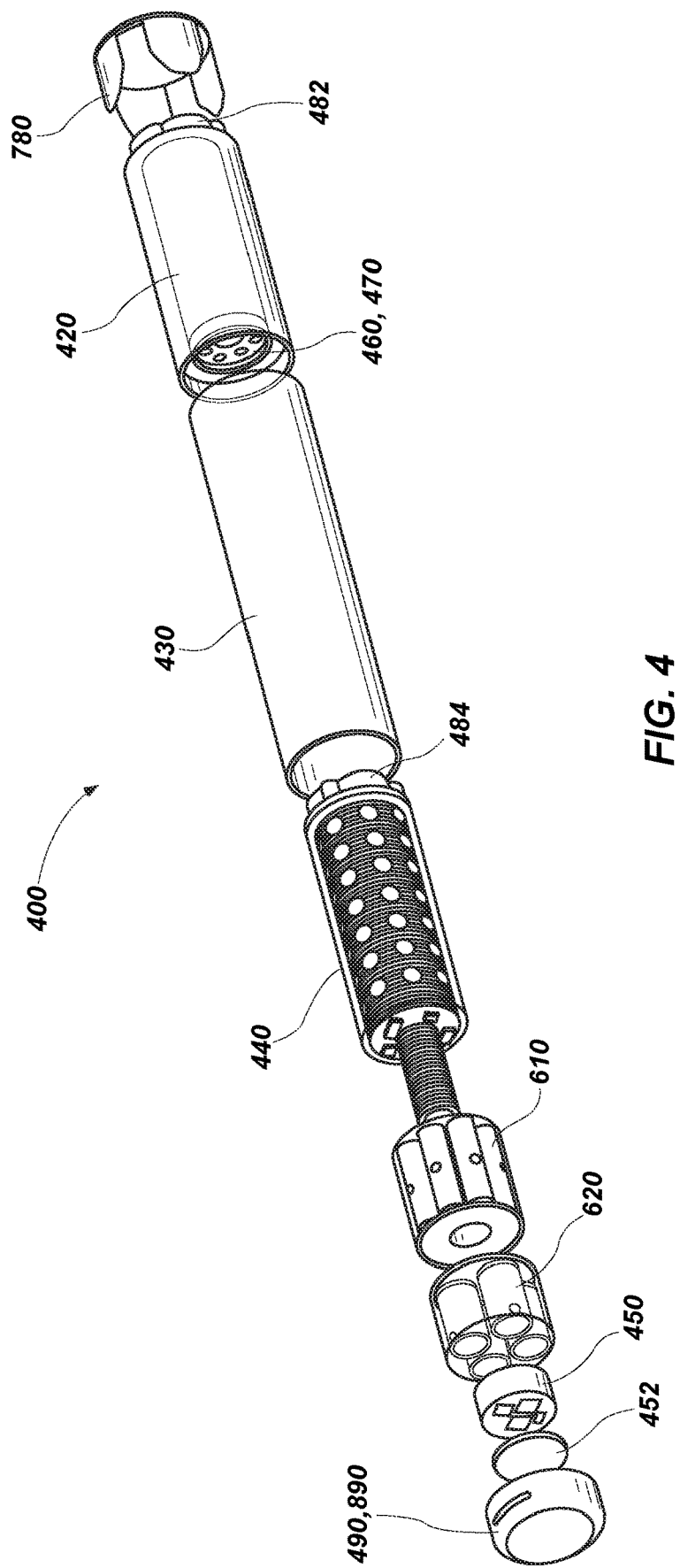
FIG. 4 illustrates an exploded view of an eject vehicle showing various elements of the EV according to one or more embodiments of the present disclosure.

FIG. 4 illustrates an exploded view of an eject vehicle 400 showing various elements of the eject vehicle 400 according to one or more embodiments of the present disclosure. Reference may also be made to FIGS. 1A-3 in describing features and operations of the eject vehicle 400. The eject vehicle 400 is a lightweight guided projectile that, in some embodiments, may be designed to be launched from chaff/flare dispensers. The eject vehicle 400 may intercept and destroy incoming aerial threats 120 at ranges sufficient to prevent damage to the host aerial platform 100. The eject vehicle 400 may be packaged in a cartridge containing an impulse charge and interface electronics designed to fit the AN/ALE-47 dispenser magazine.

The eject vehicle 400 includes an ejection piston 780 configured to transmit the energy of an impulse cartridge 750 (described below in connection with FIG. 7) to the eject vehicle 400 and launch the eject vehicle 400 away from the aerial platform 100 to a distance safe enough for the eject vehicle 400 to begin performing alignment and interception maneuvers.

A rocket motor 420 may be used to propel the eject vehicle 400 toward the aerial threat 120 after the eject vehicle 400 has been rotated such that a longitudinal axis of the eject vehicle 400 is pointed in the general direction of the aerial threat 120. A first set of folding fins 482 may be attached to the rocket motor 420 and configured to deploy once the eject vehicle 400 has exited the dispenser 200. The folding fins 482 are small and configured to provide stability to the eject vehicle 400 during its flight path rather than as control surfaces for directing the fight path.

An airframe shell 430 may be configured to contain a warhead 440, a divert thruster module 610, a nose thruster module 620 (may also be referred to herein as an alignment thruster module 620), an electronics module 450, and a battery 452. An airframe nose 490 may be configured to attach to the airframe shell 430 to protect the electronics module 450 and provide a somewhat aerodynamic nose for the eject vehicle 400.

A safe and arm module 460 may be included within the airframe shell 430 and configured to safely arm the warhead 440 when the eject vehicle 400 is a safe distance away from the aerial platform 100.

Figure 5A:
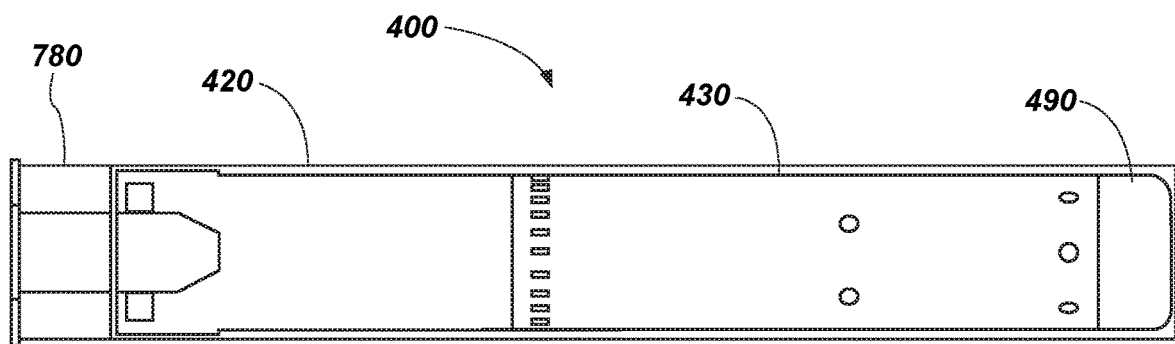
FIGS. 5A-5C illustrate the eject vehicle of FIG. 4 as it may be configured during various stages of an intercept mission according to one or more embodiments of the present disclosure.
Figure 5B:
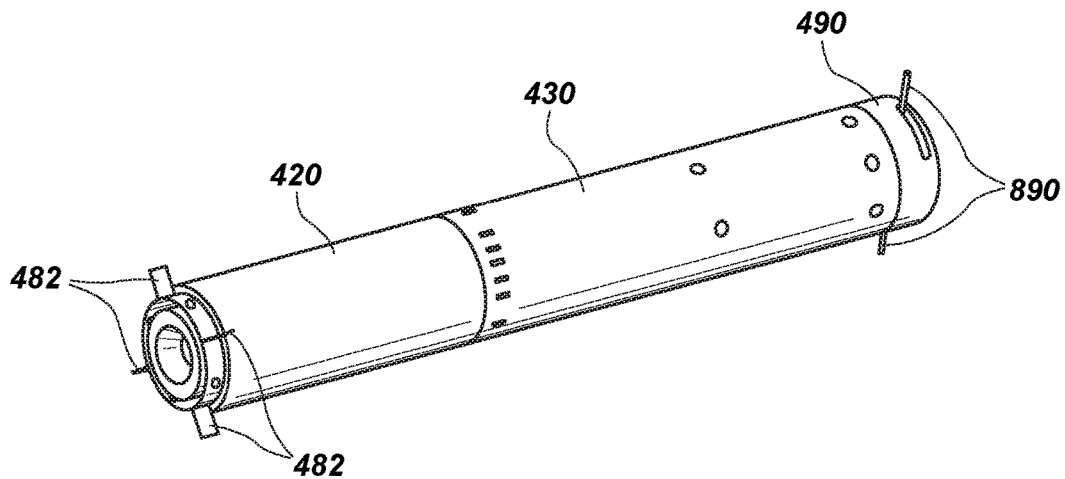
Figure 5C:
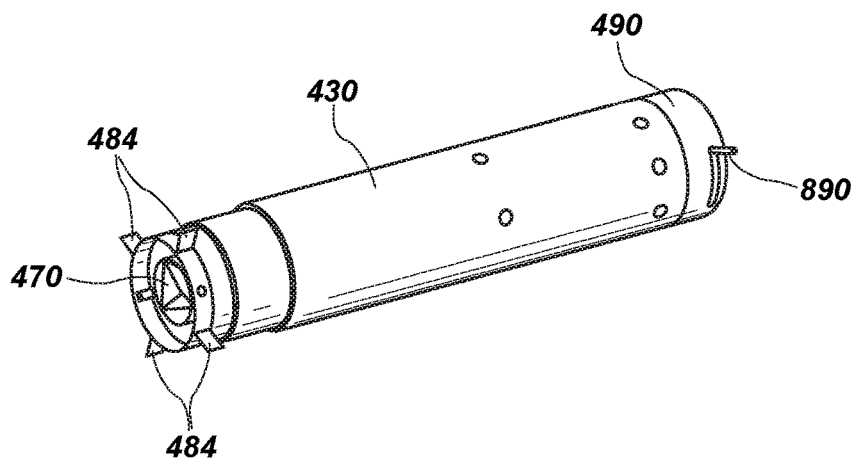

FIGS. 5A-5C illustrate the eject vehicle 400 of FIG. 4 as it may be configured during various stages of an intercept mission according to one or more embodiments of the present disclosure. Stage 1, in FIG. 5A, illustrates the eject vehicle 400 in a cartridge 710 (FIG. 7) and includes the ejection piston 780, the rocket motor 420, the airframe shell 430, and the airframe nose 490.

Stage 2, in FIG. 5B, illustrates the eject vehicle 400 after it has been dispensed and shows the rocket motor 420, the airframe shell 430, and the airframe nose 490. FIG. 5B also illustrates the folding fins 482 deployed near the end of the rocket motor 420 and wireless communication antennas 890 deployed near the airframe nose 490.

Stage 3, in FIG. 5C illustrates the eject vehicle 400 after the rocket motor 420 has burned and been detached from the airframe shell 430. At this stage, the eject vehicle 400 may be referred to as a terminal vehicle and includes the airframe nose 490, the wireless communication antennas 890, and the airframe shell 430. Still within the airframe shell 430 are the warhead 440, the divert thruster module 610, the alignment thruster module 620, the electronics module 450, the battery 452, and the safe and arm module 460. After the rocket motor 420 is detached, a second set of folding fins 484 are deployed from the airframe shell 430 to stabilize the eject vehicle 400 during the remainder of the flight to intercept the aerial threat 120. This second set of folding fins 484 are used to replace the first set of folding fins 482 that were attached to the rocket motor 420, which has been detached from the airframe shell 430 during stage 3.

In addition, after the rocket motor 420 is detached, one or more corner reflectors 470 are exposed. The corner reflector 470 may be configured with sharp angles to enhance radar detection of the eject vehicle 400 by a radar module 900 on the aerial platform 100. For example, the corner reflector 470 may be configured as an interior angle of a small cube shape, which will enhance radar detection.

Returning to FIG. 4, the alignment thruster module 620 is offset from a center of mass of the eject vehicle 400 such that an initial pitch maneuver can be performed to align the longitudinal axis of the eject vehicle 400 along an intercept vector pointed toward the aerial threat 120. This alignment maneuver is performed prior to the burn of the rocket motor 420.

The divert thruster module 610 is positioned substantially near a center of mass of the terminal vehicle and is used to laterally divert the terminal vehicle from its current flight path to make minor corrections to the flight path in order to more accurately intercept the aerial threat 120. The terminal vehicle may be referred to herein as the eject vehicle 400 and it should be understood what is being referred to based on the context of the discussion.

The warhead 440 may be command detonated when the radar module 900 on the aerial platform 100 determines that the eject vehicle 400 has reached the closest point of approach (nominally about 15 cm). The use of thrusters, provide the fast reaction times that may be needed to intercept the aerial threat 120 at a nominal distance of about 50 meters when the aerial threat 120 is launched from a range of about 100 meters.

Figure 6A:
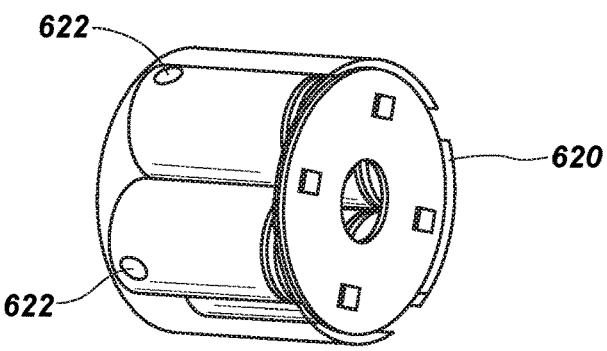
FIGS. 6A-6C illustrate various propulsion and thruster elements that may be included with one or more embodiments of the present disclosure.
Figure 6B:
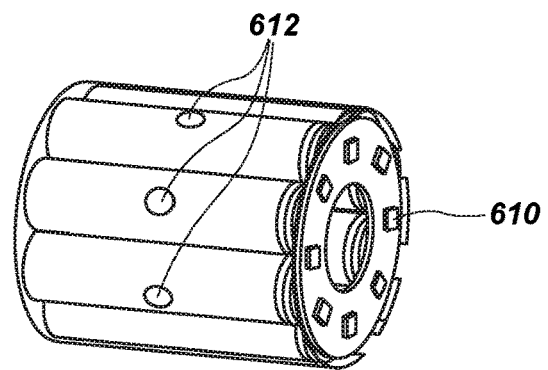
Figure 6C:
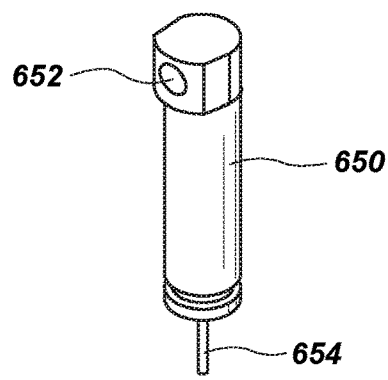

FIGS. 6A-6C illustrate various propulsion and thruster elements that may be included with one or more embodiments of the present disclosure. FIG. 6A illustrates a nose thruster module 620 with four nose thrusters 622 (two are hidden) arranged around a periphery of the nose thruster module 620. These nose thrusters 622 (also referred to herein as alignment thrusters 622) are positioned to generate a perpendicular force on the eject vehicle 400 relative to the longitudinal axis and are offset from the center of mass of the eject vehicle 400 so that an initial pitch maneuver can be performed to rotate and align the longitudinal axis of the eject vehicle 400 along an intercept vector pointed toward the aerial threat 120. In this embodiment, the four nose thrusters 622 are orthogonally arranged giving two opportunities to adjust the pitch of the eject vehicle 400 in each direction. Of course, other embodiments may include fewer or more alignment thrusters 622.

FIG. 6B illustrates a divert thruster module 610 with eight divert thrusters 612 (five are hidden) arranged around a periphery of the divert thruster module 610. These divert thrusters 612 are positioned to generate a perpendicular force on the eject vehicle 400 relative to the longitudinal axis and are positioned near the center of mass of the eject vehicle 400 so that the divert thrusters 612 will move the eject vehicle 400 laterally to a slightly different travel path, while substantially maintaining the same pitch. Thus, the divert thrusters 612 can modify the flight path of the eject vehicle 400 to correct for minor errors in the initial pitch maneuvers pointing directly toward the aerial threat 120. In this embodiment, eight divert thrusters 612 are used giving eight opportunities to adjust the flight path of the eject vehicle 400 during its flight toward the aerial threat 120. Of course, other embodiments may include fewer or more divert thrusters 612.

FIG. 6C illustrates a thruster 650 configured to expel a gas through a nozzle 652 to create a lateral force. The thruster 650 may be controlled from a thrust signal 654, which may be connected to the electronics module 450 of the eject vehicle 400. The thruster 650 is one example of a type of thruster that may be used for both the divert thrusters 612 and the alignment thrusters 622.

Figure 7:
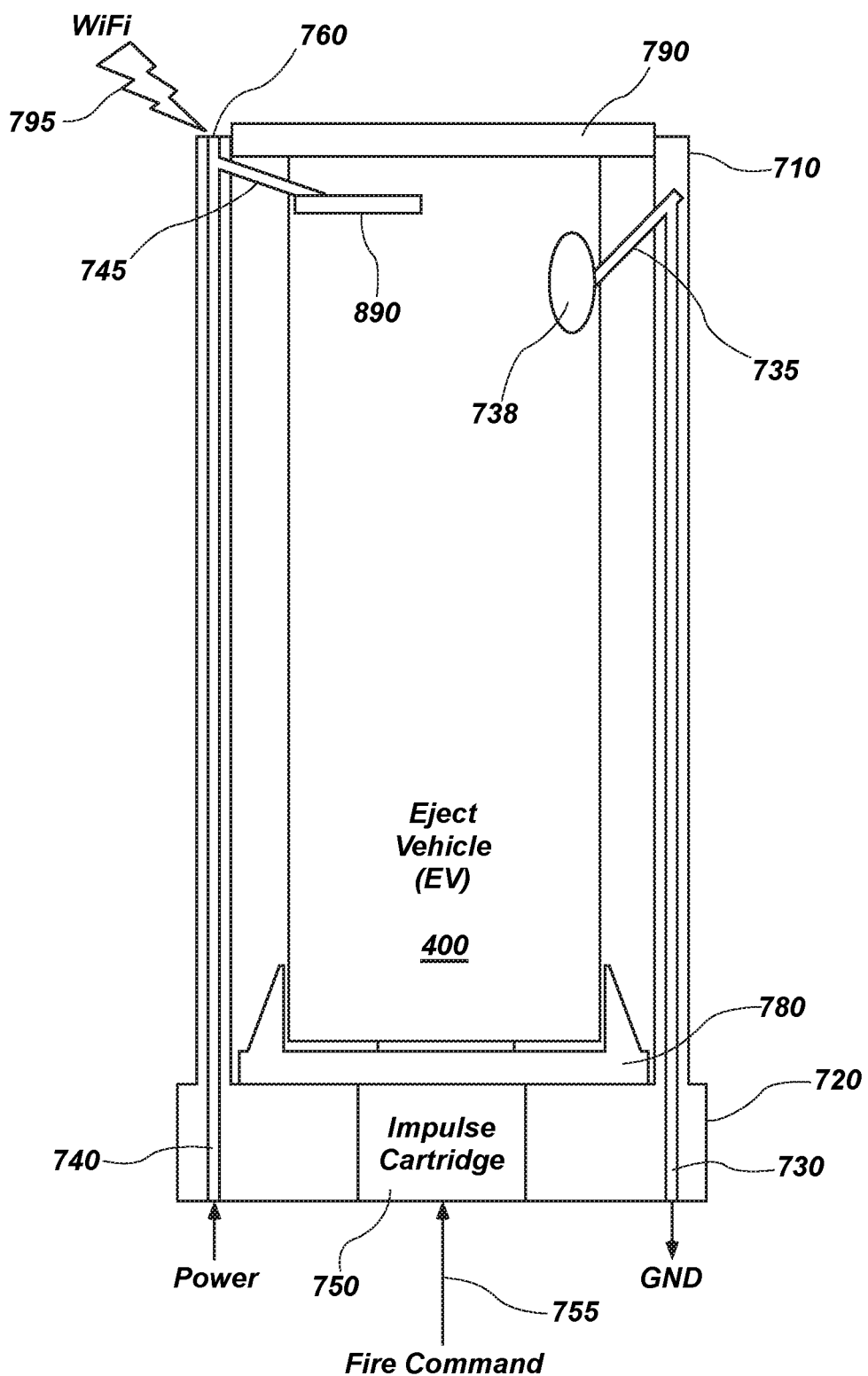
FIG. 7 illustrates various electrical and communication connections that may be present on an EV while it is disposed on the mobile platform prior to launch.

FIG. 7 illustrates various electrical and communication connections that may be present on the eject vehicle 400 while it is disposed on the aerial platform 100 (FIGS. 1A and 2B) prior to launch. A cartridge 710 includes a cartridge flange 720 such that the cartridge 710 may be securely placed in a dispenser 200 (FIG. 2A). An end cap 790 may be positioned over the cartridge 710 to hold the eject vehicle 400 within the cartridge 710. An impulse cartridge 750 is positioned near the base of the cartridge flange 720 and is configured to fire in response to a fire command signal 755 from the radar module 900 (FIG. 3) or other electronics on the aerial platform 100. An ejection piston 780 is positioned between the impulse cartridge 750 and the eject vehicle 400 and is configured to transmit the energy of the firing impulse cartridge 750 to the eject vehicle 400 and propel the eject vehicle 400 out of the dispenser 200 and safely away from the aerial platform 100.

A power signal 740 and a ground signal 730 may run along or through the cartridge to an antenna spring contact 745 and a ground spring contact 735, respectively. The ground spring contact 735 is configured to flexibly couple with a ground patch 738 on the eject vehicle 400 to provide a ground for the eject vehicle 400 electronics while the eject vehicle 400 is in the cartridge 710. The antenna spring contact 745 is configured to flexibly couple with the antenna 890 on the eject vehicle 400 and a power signal on the eject vehicle 400 to provide power and direct communication for the eject vehicle 400 electronics while the eject vehicle 400 is in the cartridge 710. The cartridge 710 may include a cartridge antenna 760 that may be coupled to the antenna 890 of the eject vehicle 400 by the antenna spring contact 745. Thus, the eject vehicle 400 may communicate wirelessly 795 with electronics onboard the aerial platform 100 through the antenna 890 on the eject vehicle 400 or through the cartridge antenna 760.

Figure 8:
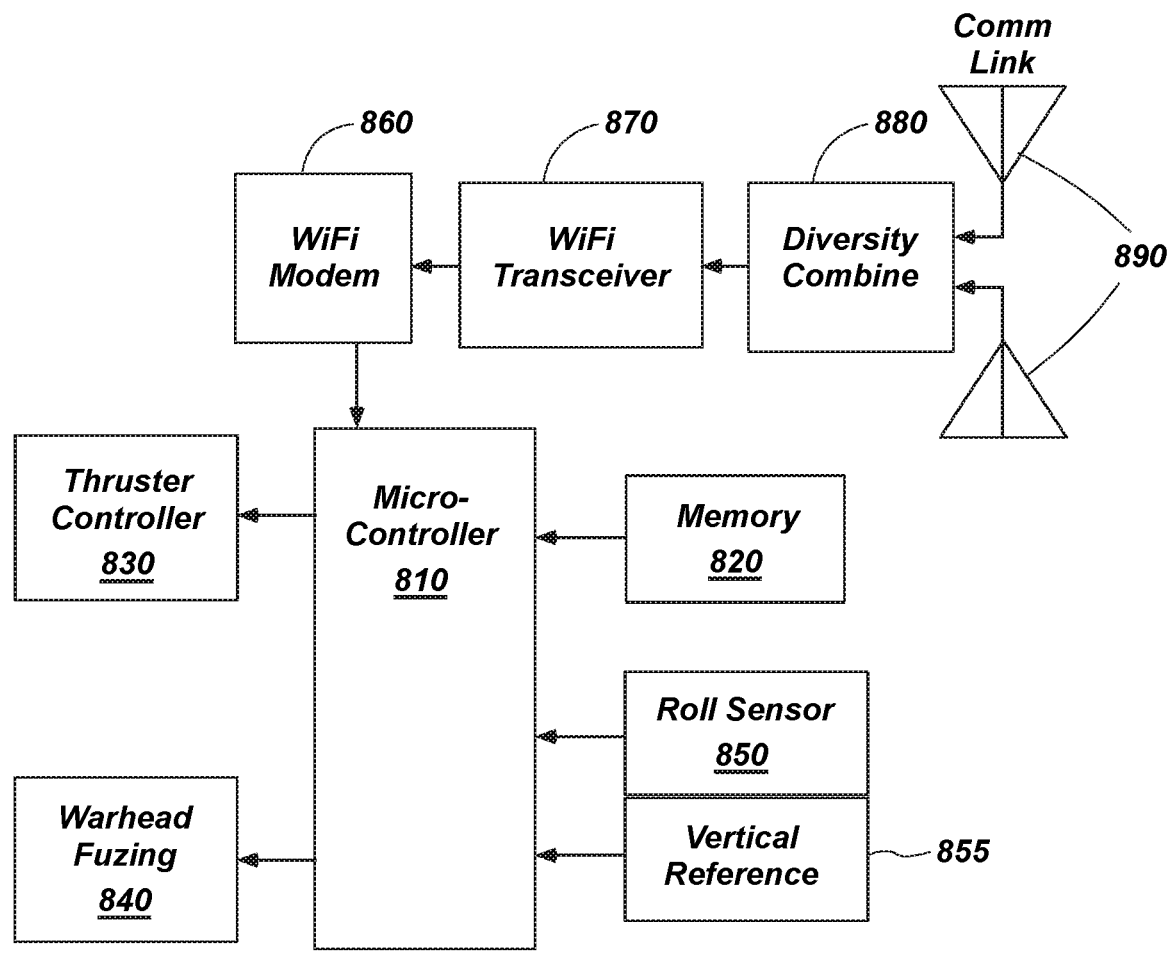
FIG. 8 is a block diagram illustrating elements that may be present on the eject vehicle according to one or more embodiments of the present disclosure.

FIG. 8 is a block diagram illustrating elements that may be present on the eject vehicle 400 according to one or more embodiments of the present disclosure. A microcontroller 810 may be coupled to a memory 820, which is configured to hold instructions for execution by the microcontroller 810 and data related to command and control of the eject vehicle 400. The microcontroller 810 may be any suitable microcontroller, microprocessor, or custom logic configured to directly execute, or execute responsive to software instructions, processes related to operation of the eject vehicle 400.

The memory 820 may be any suitable combination of volatile and non-volatile memory configured to hold data and computing instructions related to operation of the eject vehicle 400.

One or more antennas 890 may be configured to provide a communication link with electronics (e.g., the radar module 900) onboard the aerial platform 100. As non-limiting examples, the communication link may be configured using Wi-Fi or WiMAX frequencies and protocols. A diversity combiner 880 may be used to combine signals from multiple antennas.

A communication transceiver 870 (e.g., a Wi-Fi transceiver) may be coupled to the diversity combiner 880 and be configured to transmit and receive frequencies to and from the diversity combiner 880. A communication modem 860 (e.g., a Wi-Fi modem) may be coupled to the communication transceiver 870 and be configured to package and modulate communication information for communication transmission as well as demodulate and extract information from communication reception. The microcontroller 810 receives information from the communication modem 860 and may perform operations related to the received information. In addition, based on processes performed on the microcontroller 810, information may be sent to the communication modem 860 for transmission through the one or more antennas 890.

The microcontroller 810 may be coupled to a thrust controller 830, which interfaces with the alignment thrusters 622 and the divert thrusters 612 (FIGS. 6A and 6B). A warhead fusing interface 840 may be provided to interface to the warhead 440 (FIG. 4), the safe and arm module 460 (FIG. 4) or a combination thereof, for arming and control of detonation of the warhead 440.

A roll sensor 850 and a vertical reference 855 may be used in combination to determine the attitude of the eject vehicle 400 as well as a spin rate and spin position of the eject vehicle 400 and communicate such information to the microcontroller 810. Other types of sensors, such as, for example, accelerometers and magnetometers may also be used for this purpose.

Figure 9A:
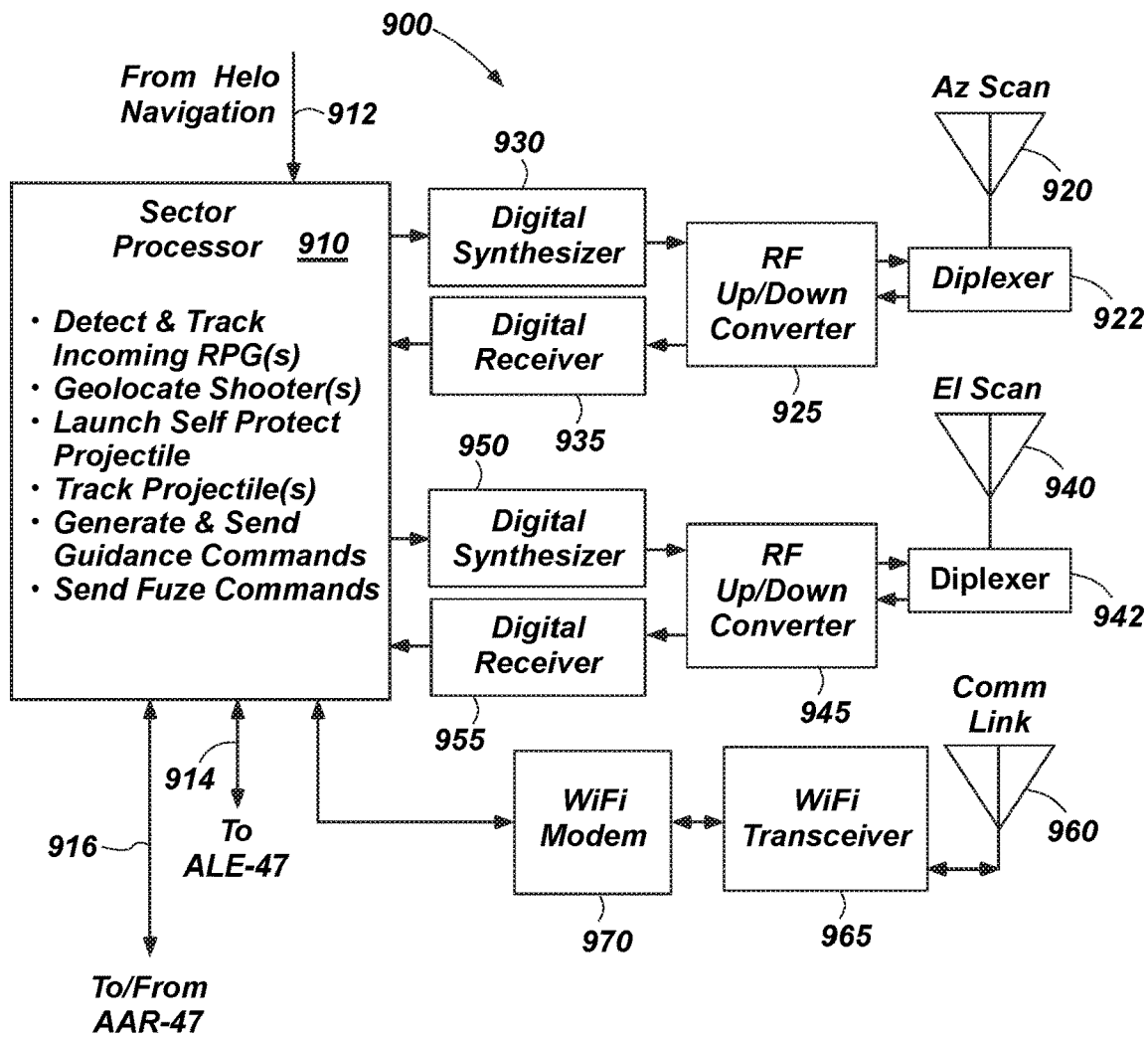
FIG. 9A is a block diagram illustrating elements that may be present on the aerial platform according to one or more embodiments of the present disclosure.
Figure 9B:
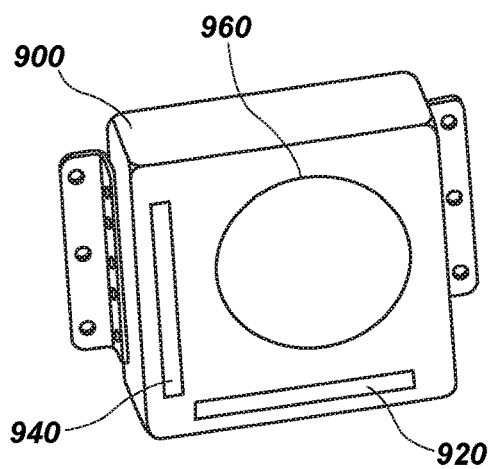
FIG. 9B is a perspective view of a radar module that may be present on the aerial platform according to one or more embodiments of the present disclosure.

FIG. 9A is a block diagram illustrating elements that may be present on the aerial platform 100 according to one or more embodiments of the present disclosure. The electronics module and functions thereof on the aerial platform 100 may be contained within a radar module 900, as illustrated in FIG. 9B. Alternatively, some of the function may be within the radar module 900 while other functions may be located in different places on the aerial platform 100 such as, for example, the central processor 360 (FIG. 3). The various modules used to control the radar module 900 and the eject vehicle 400 and determine other information related thereto may be collectively referred to herein as an "onboard system."

FIG. 9B is a perspective view of the radar module 900 that may be present on the aerial platform 100 according to one or more embodiments of the present disclosure. The radar module 900 includes an azimuth scan radar antenna 920, an elevation scan radar antenna 940, and a wireless communication link antenna 960.

The azimuth scan radar antenna 920 is included in an azimuth radar subsystem, which includes a diplexer 922 for combining radar sent and reflected radar received. A radio frequency (RF) up/down converter 925 converts the radar frequencies sent from a digital synthesizer 930 and converts the radar frequencies received for use by a digital receiver 935.

The elevation scan radar antenna 940 is included in an elevation radar subsystem similar to the azimuth radar subsystem, but configured for the elevation direction. The elevation radar subsystem includes a diplexer 942 for combining radar sent and reflected radar received. A radio frequency (RF) up/down converter 945 converts the radar frequencies sent from a digital synthesizer 950 and converts the radar frequencies received for use by a digital receiver 955.

The wireless communication link antenna 960 may be configured to provide a communication link with electronics onboard the eject vehicle 400. As non-limiting examples, the communication link may be configured using Wi-Fi or WiMAX frequencies and protocols. A wireless communication subsystem includes a communication transceiver 965 (e.g., a Wi-Fi transceiver) coupled to the wireless communication link antenna 960 and configured to transmit and receive frequencies to and from the antenna 960. A communication modem 970 (e.g., a Wi-Fi modem) may be coupled to the communication transceiver 965 and be configured to package and modulate communication information for communication transmission as well as demodulate and extract information from communication reception.

A sector processor 910 communicates with the elevation radar subsystem, the azimuth radar subsystem, and the wireless communication subsystem. The sector processor 910 may communicate helicopter navigation information 912 from other electronics on the aerial platform 100. Referring also to FIG. 3, the sector processor 910 may also communicate with the dispenser 200 (e.g., one or more ALE-47s) using communication signal 914 and the missile approach warning system 320 (e.g., one or more AAR-47s) using communication signal 916. The sector processor 910 performs a number of functions to detect and track aerial threats 120, control and track the eject vehicle 400, as well as other functions related to the active protection system. In some embodiments, communication between the dispenser 200 and the sector processor 910 may be accomplished through the missile approach warning system 320.

The sector processor 910 in combination with the radar subsystems can detect and track incoming aerial threats 120 (e.g., RPGs). Based on the tracking of the incoming aerial threat 120, and in combination with navigation information from the aerial platform 100, the sector processor 910 can extrapolate to a geo-location of the attacker 110, from where the aerial threat 120 was launched. The aerial platform 100 may act on this geo-location or transmit the geo-location to other aerial platforms or ground-based platforms for follow-up actions.

The sector processor 910 may be configured to send launch commands to the dispenser 200 on communication signal 914 to launch one or more eject vehicles 400 to intercept one or more detected aerial threats 120. The sector processor 910 may also calculate required pitch adjustments that should be performed by the eject vehicle 400 after it has been ejected and is safely away from the aerial platform 100.

Once the eject vehicle 400 is launched, the sector processor 910 may be configured to track the eject vehicle 400 and send guidance commands (i.e., divert commands) to the eject vehicle 400 so the eject vehicle 400 can perform divert maneuvers to adjust its flight path toward the aerial threat 120. The sector processor 910 may also be configured to determine when the eject vehicle 400 will be near enough to the aerial threat 120 to destroy the aerial threat 120 by detonation of the warhead 440 on the eject vehicle 400. Thus, a detonation command may be sent to the eject vehicle 400 instructing it to detonate, or instructing it to detonate at a detonation time after receiving the command.

Referring to FIGS. 10A, 10B, 9, and 3, the radar modules 900 may be mounted in close proximity to the existing AN/ALR-47 missile warning receiver (MWR) installations to provide 360 degrees spatial coverage while minimizing wiring modifications to the helicopter. It is anticipated that an aerial threat 120 will be launched at relatively short ranges, typically on the order of 100 m. The radar modules 900 are designed to detect and track the low radar cross section (typically −15 dBsm) of an RPG fired from any aspect angle, within 30 milliseconds of launch, and out to a range of at least 300 meters. The radars operate in the Ka-Band to minimize the antenna size yet provide the precision angular measurements needed to guide the eject vehicle 400 to intercept the aerial threat 120. A high pulse-repetition-frequency pulse Doppler waveform provides radial velocity measurements as well as the clutter rejection needed to operate in close proximity to the ground while detecting low radar cross-section targets. Pulse compression may be used to achieve precision range measurements as well as increasing the transmit duty cycle to best utilize the capabilities of existing Ka-Band solid-state power amplifiers. The antennas generate a pair of orthogonal fan beams, providing a continuous track-while-scan capability to minimize detection latency and provide multiple target track capability. Beam scanning can be accomplished using a frequency scan method to eliminate the need for expensive phase shifters.

Figure 10A:
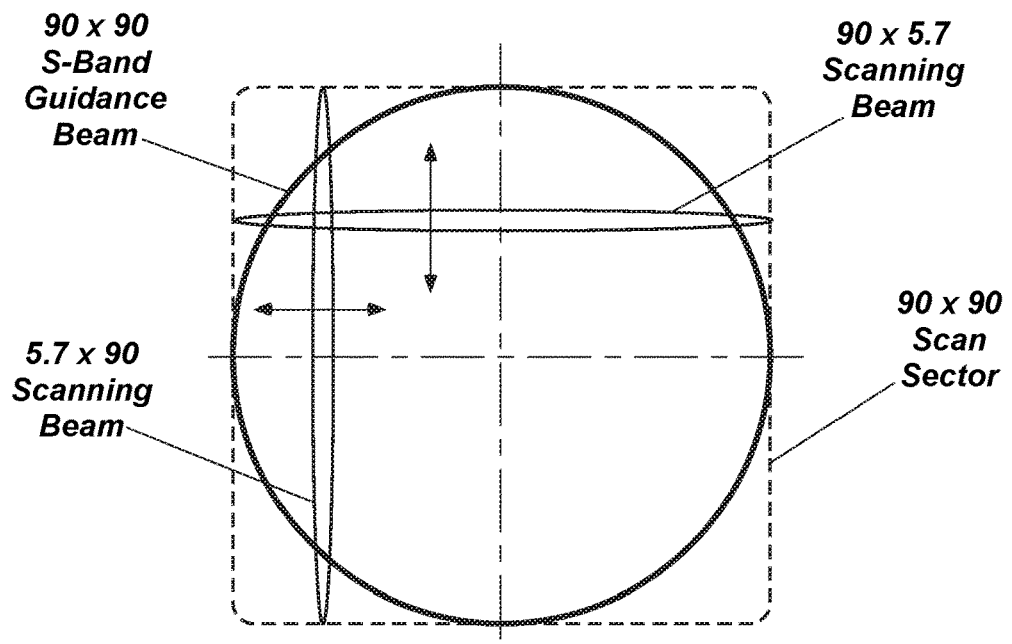
FIGS. 10A and 10B are diagrams illustrating radar scanning beams during an acquisition mode and a tracking mode, respectively.

FIG. 10A illustrates an acquisition mode wherein an elevation radar generates an elevation fan beam extending in the vertical direction that sweeps in the horizontal direction and an azimuth radar generates an azimuth fan beam extending in the horizontal direction that sweeps in the vertical direction. Thus, an entire 90-degree scan sector can be covered by the radar systems to quickly detect and acquire an incoming aerial threat 120 when it is within range.

Figure 10B:
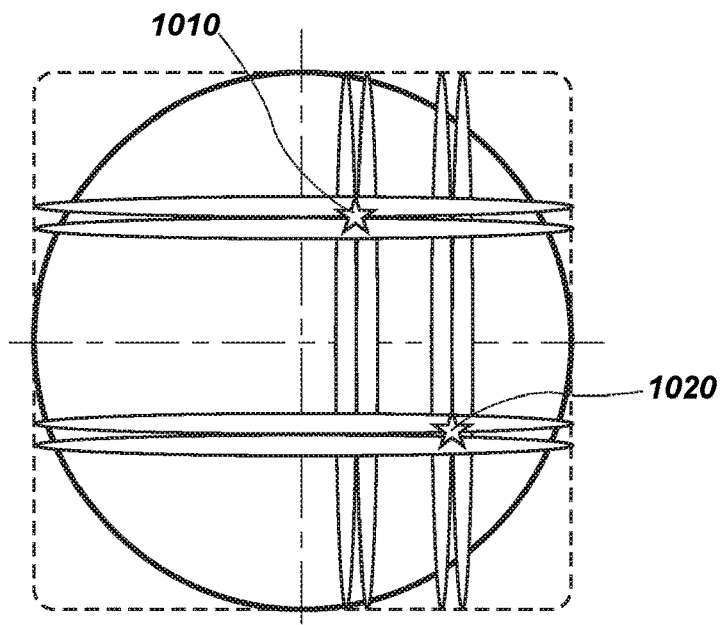

FIG. 10B illustrates a track mode. In FIG. 10B, two sequential azimuth scans and two sequential elevation scans are shown that pinpoint a first location 1010 of the eject vehicle 400. In addition, two sequential azimuth scans and two sequential elevation scans are shown that pinpoint a second location 1020 of the aerial threat 120. With this location information, the sector processor 910 can derive relative position information that can be used to provide divert commands to the eject vehicle 400 to more closely intercept the aerial threat 120.

Figure 11:
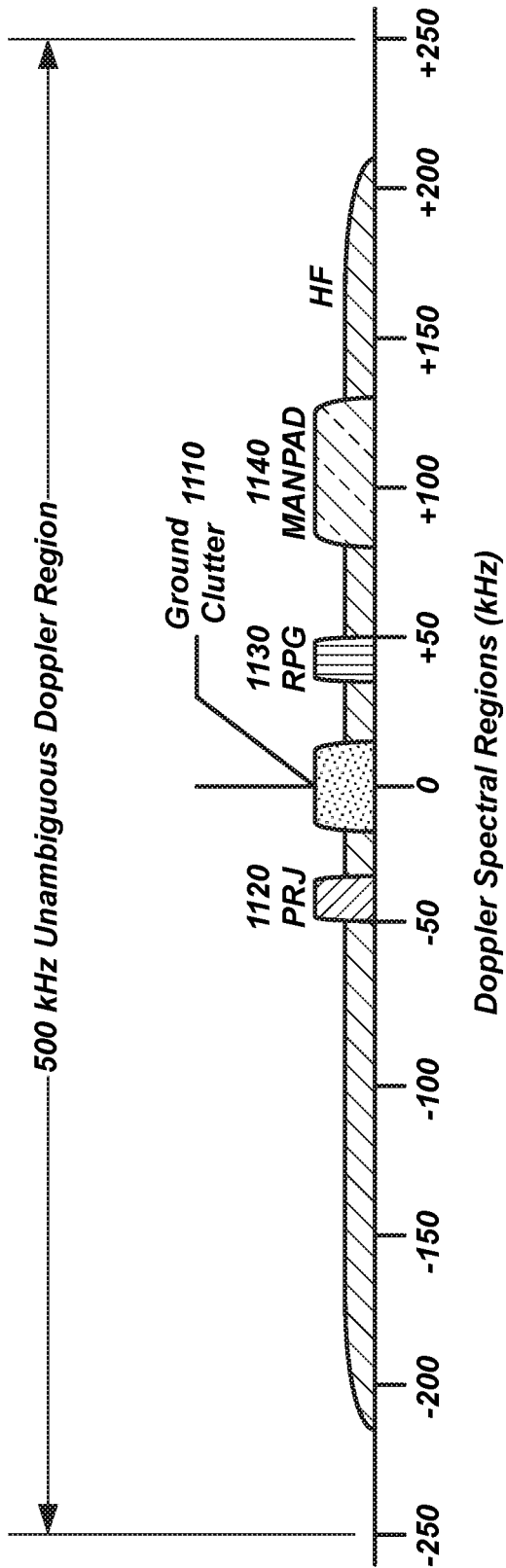
FIG. 11 is a spectrum diagram illustrating possible Doppler spectrum regions where various aerial vehicles may be detected.

FIG. 11 is a spectrum diagram illustrating possible Doppler spectrum regions where various aerial vehicles may be detected. As non-limiting examples, FIG. 11 illustrates a ground clutter spectrum 1110, a spectrum 1120 for the eject vehicle 400 (i.e., PRJ in FIG. 11), a spectrum 1130 that may be indicative of an RPG, and a spectrum 1140 that may be indicative of a MANPAD. Of course, other aerial threats and their associated spectrums may also be identified.

Figure 12:
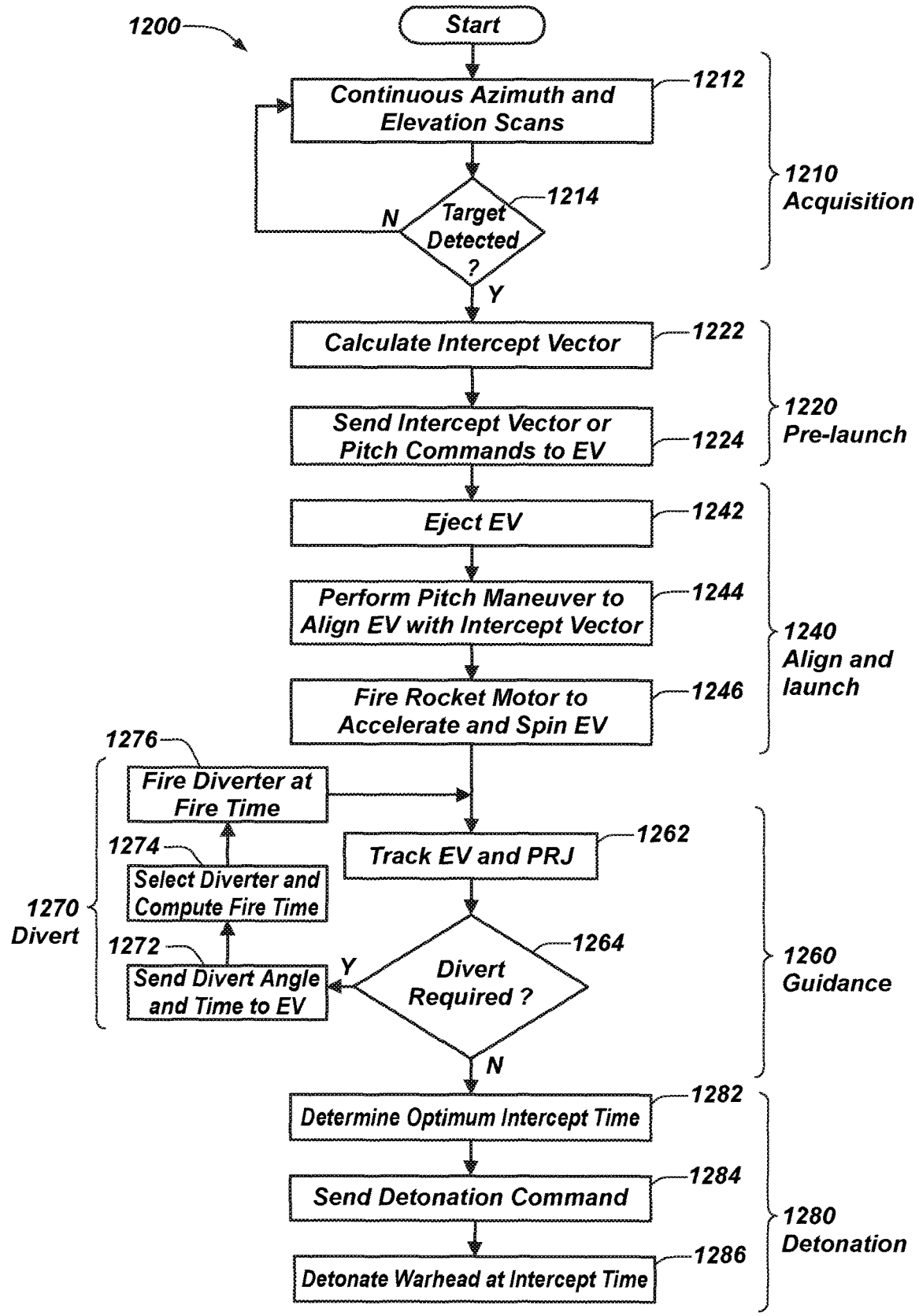
FIG. 12 is a simplified flow diagram illustrating some of the processes involved in one or more embodiments of the present disclosure.

FIG. 12 is a simplified flow diagram illustrating some of the processes 1200 involved in one or more embodiments of the present disclosure. The processes may be loosely considered as an acquisition phase 1210, a pre-launch phase 1220, an align and launch phase 1240, a guidance phase 1260, a divert phase 1270, and a detonation phase 1280.

Operation block 1212 indicates that continuous radar scans are performed looking for incoming aerial threats. Decision block 1214 indicates that the process loops until a target is detected. While not shown, during this phase the radar modules 900 may also be detecting distance and angle to wingman platforms (i.e., other aerial platforms) in the vicinity. Using communication between the various wingman platforms, sectors of responsibility can be identified as discussed more fully below in connection with FIG. 14.

If a target is detected, the process 1200 enters the pre-launch phase 1220. Operation block 1222 indicates that the sector processor 910 uses the range and travel direction of the incoming aerial threat 120 to calculate a threat direction to the incoming aerial threat 120 and an intercept vector pointing from a deployed eject vehicle 400 to a projected intercept point where the eject vehicle 400 would intercept the incoming aerial threat 120. Operation block 1224 indicates that the intercept vector is sent to the eject vehicle 400. The intercept vector may be sent to the eject vehicle 400 in a number of forms. The actual directional coordinates may be sent and the eject vehicle 400 would be responsible for determining the proper pitch maneuvers to perform. Alternatively, the sector processor 910 may determine the proper pitch maneuvers that the eject vehicle 400 should perform after launch and send only pitch commands (e.g., start and burn times for each alignment thruster 622) to be used during the pitch maneuvers. While FIG. 12 indicates that the intercept vector or pitch commands are sent before launch, some embodiments may be configured such that this information can be sent after launch.

During the acquisition phase 1210 and pre-launch phase 1220, the eject vehicle 400 remains in the dispenser 200 and connected to power. An RF communication link may be in operation through the eject vehicle 400 antenna via a transmission line inside the dispenser 200.

The process enters the align and launch phase 1240 after the intercept vector is determined. Operation block 1242 indicates the impulse cartridge 750 is fired to propel the eject vehicle 400 from the dispenser 200 and safely away from the aerial platform 100.

Operation block 1244 indicates that the pitch maneuvers are performed to align the eject vehicle 400 with the already determined intercept vector. The pitch maneuver is a two-stage process that sequentially executes an azimuth rotation and an elevation rotation to align the longitudinal axis of the eject vehicle 400 along the intercept vector. The pitch maneuver does not have to be exact. As a non-limiting example, offsets of up to about 10 to 15 degrees may be corrected during flight of the eject vehicle 400 using the divert thrusters 612 during the guidance phase 1260. After ejection, the folding fins 482 will deploy and the communication link antennas 960 will deploy and wireless communication between the eject vehicle 400 and the radar module 900 may commence.

Operation block 1246 indicates that the rocket motor 420 will fire, which accelerates the eject vehicle 400 to about 160 meters/second and imposes a spin rate on the eject vehicle 400 of about 10 Hertz. Upon exhaustion, the rocket motor 420 and folding fins 482 will separate and the terminal vehicle (TV) is exposed. With separation of the TV, the second set of folding fins 484 deploy and the corner reflector 470 is exposed.

During the guidance phase 1260, the process will perform a track and divert loop in order to adjust the flight path of the eject vehicle 400 to more closely intercept the aerial threat 120. Operation block 1262 indicates that the sector processor 910 will track the eject vehicle 400 and aerial threat 120 as discussed above with reference to FIGS. 9A-10B. Decision block 1264, indicates that the sector processor 910 will determine if a divert maneuver is required to intercept the incoming aerial threat 120 and estimate the direction of divert thrust required.

A divert phase 1270 includes operations to cause the eject vehicle 400 to modify its course. Operation block 1272 indicates that the divert direction and time, if required, are sent to the eject vehicle 400.

The divert process takes into account the rotation of the eject vehicle 400 and the direction of the desired divert thrust. This rotation adds a complication to the selection and fire time determination of the proper divert thruster 612, but also ensures that all of the available divert thrusters 612 can be used to divert the eject vehicle 400 in any desired direction substantially perpendicular to the travel direction of the eject vehicle 400. Operation block 1274 indicates that the processor on the eject vehicle 400 will select the divert thruster 612 to be fired and determine the firing time based on the divert angle received from the sector processor 910 and its internal attitude sensors.

Operation block 1276 indicates that the appropriate divert thruster 612 is fired at the appropriate fire time to move the eject vehicle 400 laterally along a diversion vector to adjust the flight path of the eject vehicle 400. As a non-limiting example, each divert thruster 612 may be capable of correcting for about two degrees of error from the initial pointing of the eject vehicle 400 during the pitch maneuver. Thus, when the divert thrusters 612 are fired when the eject vehicle 400 is in the correct rotational position, the process can slide the travel direction vector of the eject vehicle 400 toward the path of the aerial threat 120. Moreover, the process can fire in any circular direction and can fire multiple divert thrusters 612 in the same direction to repeatedly move the eject vehicle 400 in the same direction.

While FIG. 12 indicates the guidance phase 1260 and the detonation phase 1280 as operating sequentially, they also may operate in parallel. During the detonation phase 1280, operation block 1282 indicates that the sector processor 910 determines an optimum intercept time when the eject vehicle 400 will be at its closest point to the aerial threat 120. Operation block 1284 indicates that a detonation command may be sent to the eject vehicle 400. This detonation command may be in the form of a detonation time for the eject vehicle 400 to count out or it may be in the form of an immediate command for the eject vehicle 400 to perform as soon as the command is received.

Operation block 1286 indicates that the warhead 440 on the eject vehicle 400 is detonated at the intercept time responsive to the detonation command received from the sector processor 910.

Figure 13:
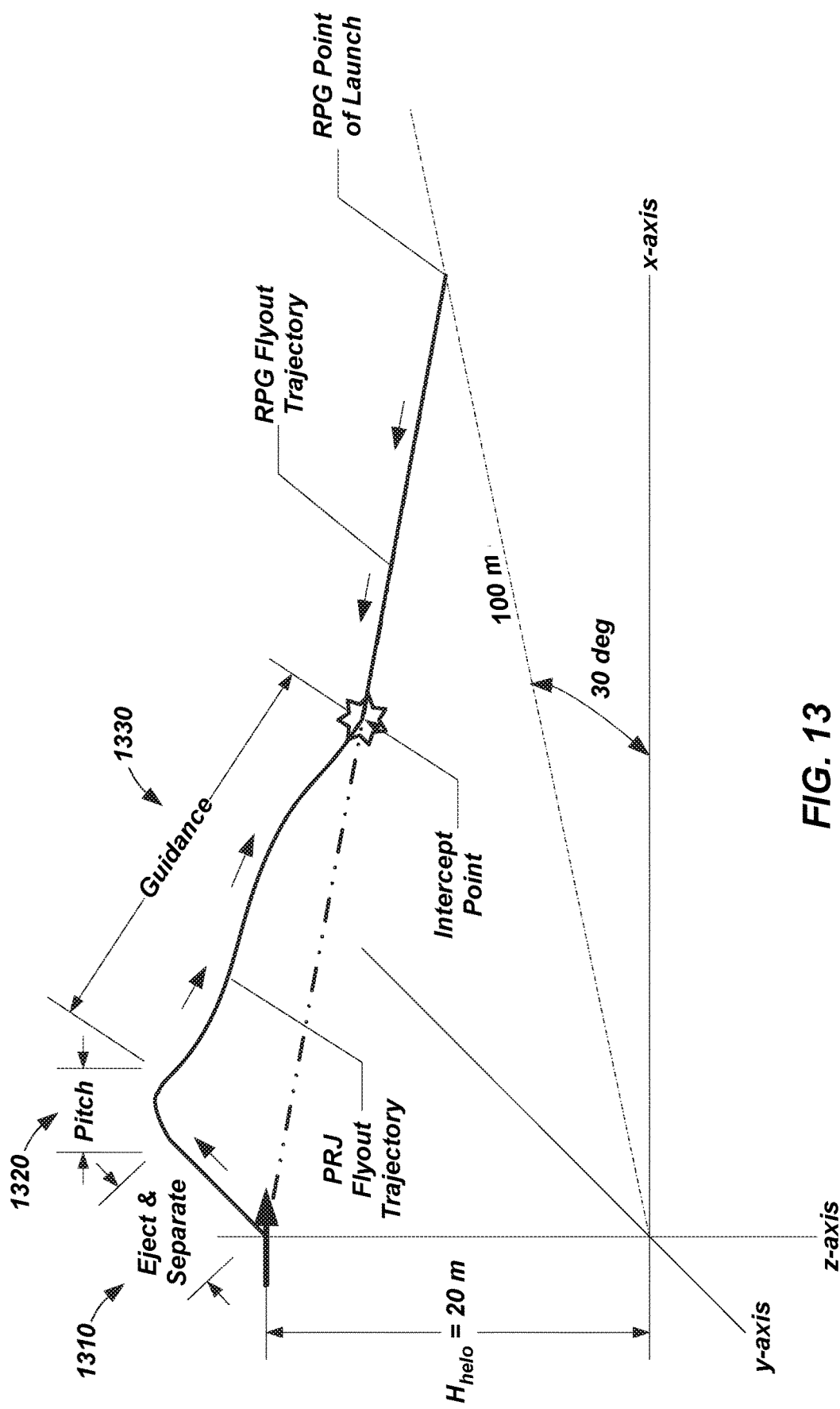
FIG. 13 illustrates an example flight path for the eject vehicle and an aerial threat during an intercept process.

FIG. 13 illustrates an example flight path for the eject vehicle 400 and an aerial threat 120 during an intercept process. In this example, a typical RPG and EV trajectory example are shown. The RPG is launched at a range of about 100 meters and 30 degrees left of the nose of the helicopter. The eject vehicle 400 receives its coordinate commands from the radar module 900 and is then ejected from the port chaff dispenser 200 at an angle of 90 degrees to the helicopter axis.

During period 1310, the eject vehicle 400 separates to a distance of about two meters from the helicopter. During period 1320, the nose thrusters 622 pitch the eject vehicle 400 to the approximate approach angle of the incoming RPG (e.g., within about ±10° accuracy). The rocket motor 420 then fires to accelerate the eject vehicle 400 to approximately 160 meters/second and is then separated from the remaining terminal vehicle upon exhaustion.

During period 1330, the radar module 900 transmits a series of divert commands to the eject vehicle 400, which fires the divert thrusters 612 to correct the trajectory of the eject vehicle 400 and intercept the RPG. A radar command is finally sent to the eject vehicle 400 to detonate the warhead 440 when the terminal vehicle reaches the closest point of approach (CPA). The guidance algorithm may be configured to produce a maximum CPA of about 30 centimeters, which is well within the lethal 0.6-meter kill radius of the warhead 440.

Figure 14:
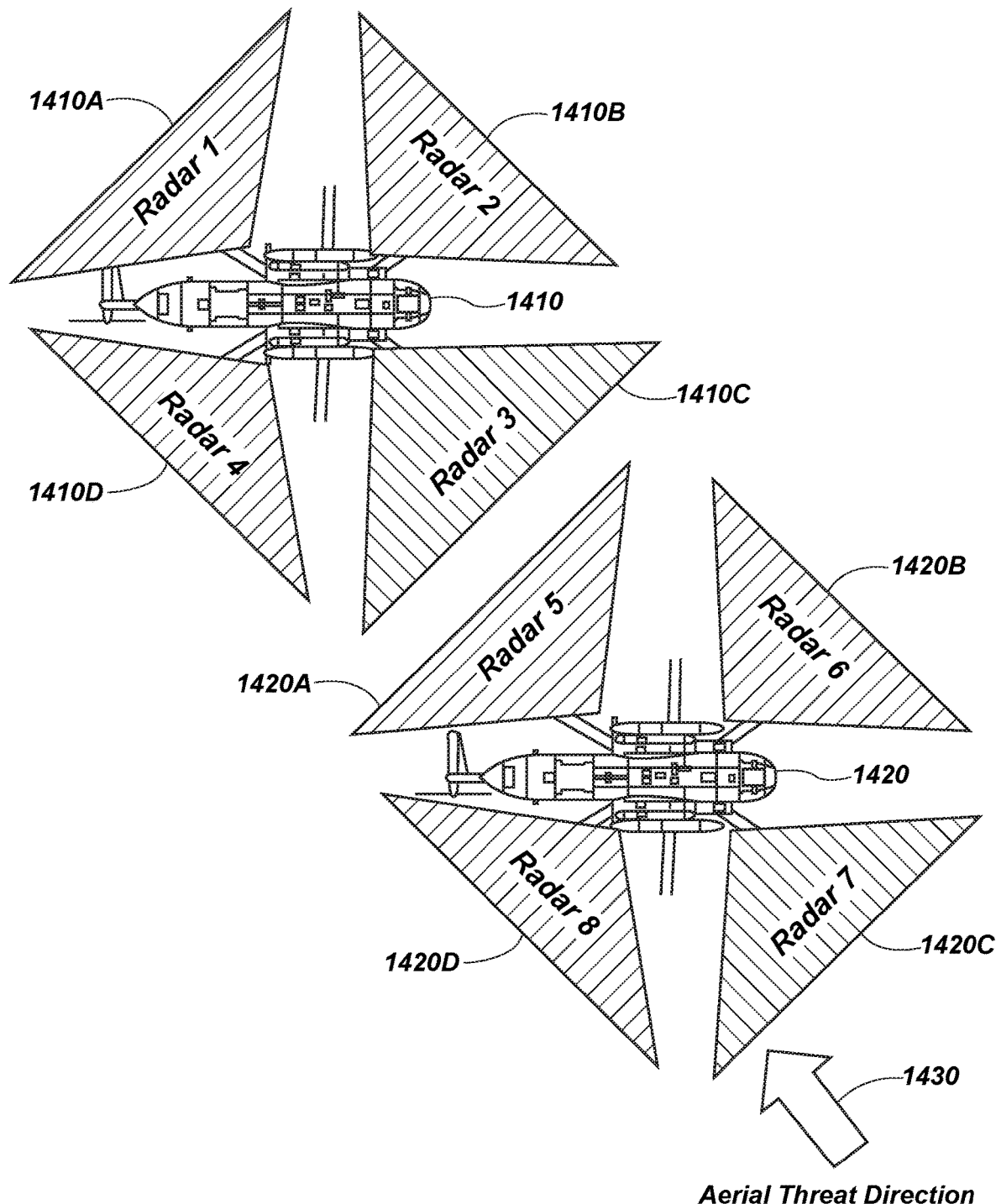
FIG. 14 illustrates two aerial vehicles flying in a formation and various radar sectors that may be covered by the aerial vehicles.

FIG. 14 illustrates two aerial vehicles flying in a formation and various radar sectors that may be covered by the aerial vehicles. A significant concern is the presence of wingman helicopters and the potential damage caused by accidental targeting. The system presented has the capability of tracking and recognizing the adjacent helicopters and networking with their associated active protection systems to avoid collateral damage by handing off sectors covered by other platforms. In FIG. 14, a first helicopter 1410 is monitoring a first radar sector 1410A, a second radar sector 1410B, a third radar sector 1410C, and a fourth radar sector 1410D.

A second helicopter 1420 near the first helicopter 1410 is monitoring a fifth radar sector 1420A, a sixth radar sector 1420B, a seventh radar sector 1420C, and an eighth radar sector 1420D. If an aerial threat approaches from a direction indicated by arrow 1430 it may be detected by the third radar sector 1410C of the first helicopter 1410 and the seventh radar sector 1420C of the second helicopter 1420. If the first helicopter 1410 attempts to launch an eject vehicle, it may cause damage to the second helicopter 1420. However, using communication between the various wingman platforms, sectors of responsibility can be identified. Thus, for the direction indicated by arrow 1430, the first helicopter 1410 can determine that the third radar sector 1410C will be covered by the seventh radar sector 1420C of the second helicopter 1420. As a result, while this formation continues, the first helicopter 1410 does not respond to threats in its third radar sector 1410C.

Returning to FIG. 9B, the radar module 900 may also be referred to herein more generically as an engagement management module (EMM) 900. As discussed above, in some embodiments, an aerial platform 100 (FIGS. 1A and 1B) may be configured with four engagement management modules 900, an example of which is shown in FIG. 3.

The engagement management modules 900 may be used as part of a helicopter active protection system (HAPS), but may also be used in other types of aerial vehicles, ground vehicles, water vehicles, and stationary deployments.

Returning to FIGS. 4 through 5C, the eject vehicle 400 may also be referred to herein as an intercept vehicle 400 and a kill vehicle (KV) 400. FIG. 5C illustrates the eject vehicle 400 after the rocket motor 420 has burned and been detached from the airframe shell 430. At this stage, the eject vehicle 400 may be referred to as a terminal vehicle, a terminal section, or a terminal section of the kill vehicle 400. Still within the terminal section are the warhead 440, the divert thruster module 610, the alignment thruster module 620, the electronics module 450 the battery 452, and the safe and arm module 460.

In operation, radar on the EMM 900 detects and tracks an aerial threat (e.g., an RPG) launched at the helicopter and launches one or more KVs 400 from the AN/ALE-47 countermeasure dispenser to intercept the incoming RPG. Following launch, the KV 400 executes a series of pitch maneuvers using nose thrusters (i.e., in the alignment thruster module 620) to align the body axis with the estimated intercept point, uses a boost motor to accelerate to high speed to intercept the RPG at maximum range, and executes a series of commands for lateral guidance maneuvers using a set of divert thrusters 610. Finally, the KV 400 warhead 440 is command detonated when the KV 400 reaches the closest point of approach (CPA) computed by an EMM guidance processor.

The flight time of the KV is typically on the order of 300 to 500 msec. During the short flight time, the KV is exposed to strong moments due to divert thruster offsets from the center of gravity and to strong aerodynamic moments due principally to the jet interaction (JI) effect when the divert thrusters are fired. The principle forces of interest are shown in FIG. 15.

FIG. 15 is a simplified side view of a kill vehicle (KV) 400 illustrating the principle forces of interest on the kill vehicle (KV) 400. Ideally, the divert thruster's 610 center of thrust, $X_{CT}$, would be aligned with the KV 400 center of gravity (CG) to minimize any moments introduced by its thrust force ($F_{DT}$). However, even with balancing during manufacturing, there will be some migration of the CG as divert thrusters 610 and alignment thrusters 622 (FIGS. 6A and 6B and also referred to herein as "pitch thrusters 622") and "attitude control thrusters 1604" (FIG. 16A) are fired and propellant is expended. Also, when the divert thrusters 610 are fired, airflow along a body 1510 of the KV 400 is disrupted, known as the jet interaction (JI) effect, which introduces a high pressure region 1506 in front of the divert thrusters 610 and a low pressure region 1508 aft of the divert thrusters 610. This causes a moment that can be represented as a force $F_{JI}$ at location $X_{JI}$. The other principle aerodynamic component is the normal force $F_N$ introduced as a function of the angle of attack α, which is the angle between a body longitudinal axis 1520 and the velocity vector V. The normal force $F_N$ acts at the center of pressure $X_{CP}$.

One or more tail fins 1524 can be used to add aerodynamic stability, but the time constants associated with these tail fins generally are not fast enough to stabilize the KV 400 during its short flight time. Instead, or in addition to the tail fins 1524, a plurality of small micro-thrusters 1604 (FIG. 16A) are added to the nose thruster module 620 (FIGS. 4 and 16A) to implement an active attitude control. This introduces $F_μ$ at location $X_μ$.

FIGS. 16A and 16B illustrate a nose thruster module 620. The nose thruster module 620 may include a plurality of pitch thrusters 622 and a plurality of attitude control thrusters 1604. FIG. 16 illustrates a plurality of cylinders 1606 and 1608 configured for storing propellant grains. The larger cylinders 1606 correspond to the pitch thrusters 622 while the smaller cylinders 1608 correspond to the attitude control thrusters 1604. FIG. 16B illustrates a plurality of nozzles 1610 and 1612, each configured to divert a flow from one of the plurality of cylinders 1606, 1608. Thus, the combination of cylinders 1606 and nozzles 1610 create the pitch thrusters 622 and the combination of cylinders 1608 and nozzles 1612 create the attitude control thrusters 1604.

Referring again to FIG. 15, the various moments described earlier may cause the KV 400 to become unstable and likely to tumble without stabilization. Maintaining the angle of attack α within a nominal 10 to 20 degrees is useful to maintain the divert thrusters 612 normal to the velocity vector V for proper guidance maneuvering and in directing the warhead 440 blast toward the RPG at the point of detonation.

Figure 17:
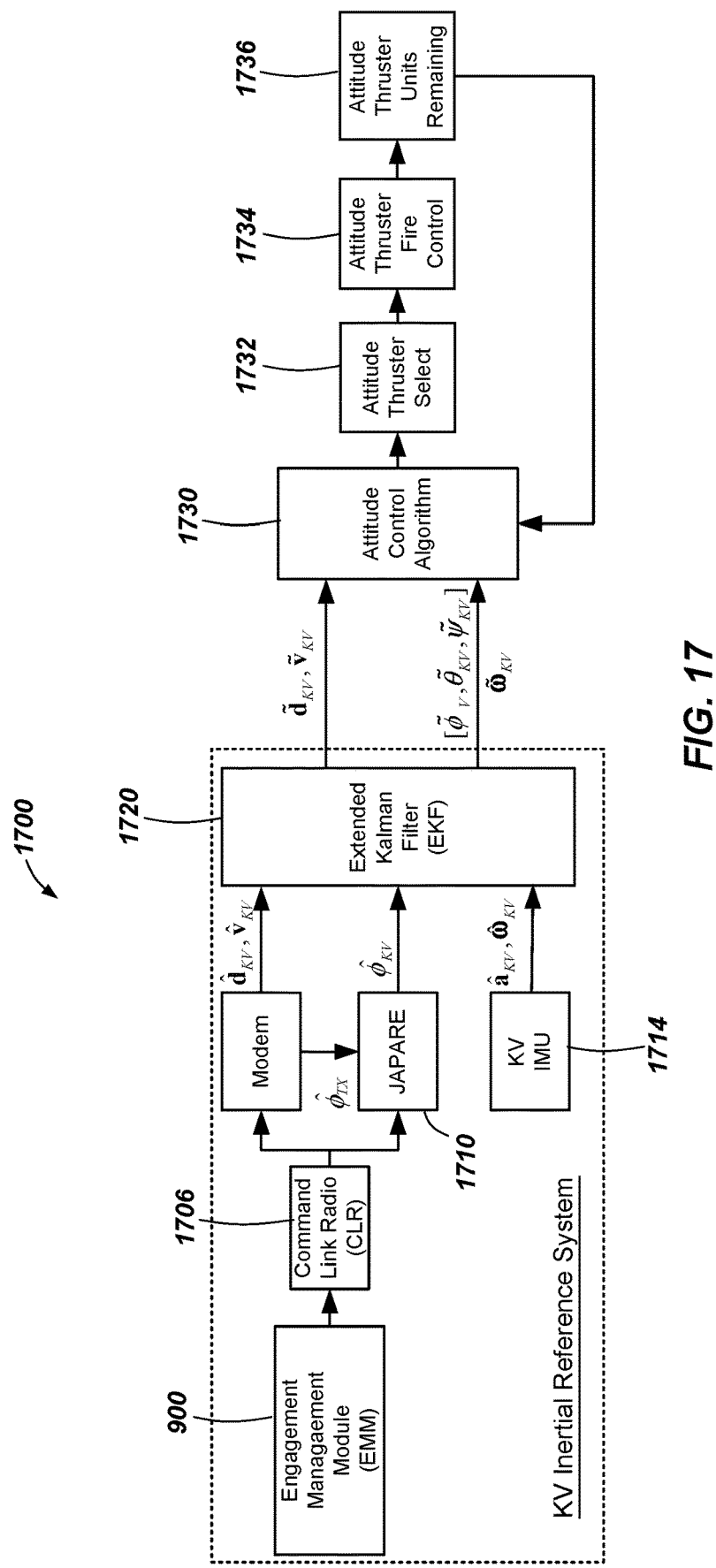
FIG. 17 is a simplified block diagram of an attitude control loop.

FIG. 17 is a simplified block diagram of an attitude control loop 1700. The EMM 900 radar generates position $\hat{d}_{KV}$ and velocity $\hat{v}_{KV}$ track data for the KV 400 and sends this information to the KV 400 via a command link radio (CLR) 1706. The EMM 900 radar also transmits a roll angle $\hat{\phi}_{TX}$ via a transmit antenna 1804 (FIG. 18) to the CLR 1706 to the KV 400 over the CLR 1706. A joint adaptive polarization and roll angle estimator (JAPRAE) algorithm 1710, resident in the KV 400, processes the polarized CLR 1706 signal received by two orthogonal linear receive antennas 1802 (FIG. 18) on the KV 400 to estimate a roll angle $\hat{\phi}_{KV}$ of the KV 400. An onboard inertial management unit (IMU) 1714 measures an acceleration $a_{KV}$ and an angular velocity $ω_{KV}$ of the KV 400. This information is processed by an extended Kalman filter (EKF) 1720 to generate fused estimates of the position $\tilde{d}_{KV}$, velocity $\tilde{v}_{KV}$, attitude $[\tilde{\phi}_{KV}, \tilde{\theta}_{KV}, \tilde{\psi}_{KV}]$, and angular velocity $\tilde{ω}_{KV}$ of the KV 400.

The attitude control algorithm 1730 is designed to fire the nose mounted attitude control thrusters 1604 to maintain the angle of attack α (FIG. 15) within preset limits. Once it is determined that an attitude correction thrust is required, the attitude control algorithm 1730 selects the next available attitude control thruster 1604 that comes into position due to the body spin at operational block 1732, and times the firing to coincide with the desired direction of thrust at operational block 1734. The attitude control algorithm 1730 maintains knowledge of which attitude control thrusters 1604 have been fired and which are available at operational block 1736.

The KV 400 has an onboard IMU 1714 that measures the angular rate and acceleration. The IMU 1714 may include a set of 3-axis gyros, 3-axis accelerometers, 3-axis magnetometers, and a field programmable gate array (FPGA) to partially process the sensor information. The sensors may be solid-state MEMS that are machined on a small circuit board. The IMU 1714 also includes an FPGA That contains the EKF 1720 to fuse the output of the sensors into 3-dimensional position, velocity, angular velocity and attitude.

Figure 18:
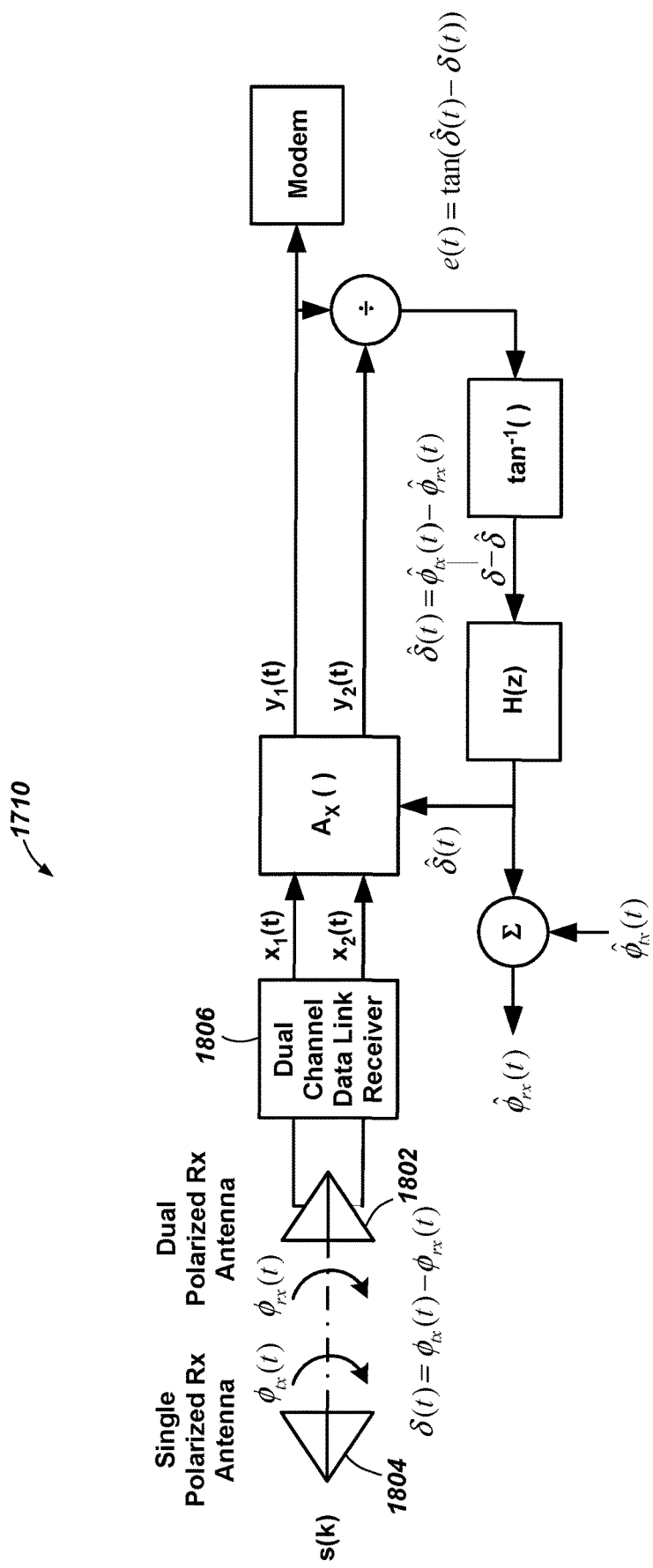
FIG. 18 is a simplified flowchart of a joint adaptive polarization and roll angle estimator (JAPRAE) algorithm.

FIG. 18 is a simplified flowchart of the joint adaptive polarization and roll angle estimator (JAPRAE) algorithm 1710. The JAPRAE algorithm 1710 may process the CLR 1706 signals received, for example, by orthogonal linearly polarized receive antennas 1802, to adapt the two receive signals in a beam former 1806 (also referred to herein as "the dual polarized receiver 1806") to match the incoming polarization to eliminate polarization mismatch loss induced by body rotation. The JAPRAE algorithm 1710 also processes the CLR 1706 signals received to provide an estimate of the KV 400 roll angle $\hat{\phi}_{rx}$.

The electric vector field of a propagating signal can be represented by a pair of orthogonal components:

$$E_{tx}(t) = [u_{tx\phi1}, u_{tx\phi2}]\begin{bmatrix}p_1(t)\\p_2(t)\end{bmatrix}E_{tx}e^{iω_ot} = U_{tx}pE_{tx}e^{iω_ot} \quad (1)$$

where $u_{tx\phi1}$ and $u_{tx\phi2}$ are orthogonal unit vectors that define the direction of the electric field components, $p_1(t)$ and $p_2(t)$ are the complex components of a unit vector that define the projection of the electric field vector on the basis vectors, and U and p are the matrix of basis unit vectors and the polarization vector, respectively. Similarly, the polarization of an antenna can be defined by a 2×1 complex vector q. The signal received by an antenna with polarization q from a signal with polarization p is simply the inner product of p and q:

$$x_{rx}(t) = q(t)^H p(t) E(t) e^{iβ(t)} \quad (2)$$

If polarizations p and q are defined in different coordinate systems, $U_{tx}$ and $U_{rx}$, then (2) becomes:

$$x_{rx}(t) = q(t)^H U_{rx}^T U_{tx} p(t) E(t) e^{iβ(t)} \quad (3)$$

Assume the polarization of a source antenna 1804 and the receive antennas 1802 can be represented as $p_o$ and $q_o$ in terms of a natural antenna coordinate system. Let $A_{tx}(t)$ and $A_{rx}(t)$ be the time varying coordinate transformations from the natural coordinate system to some inertial system. In this system the electric field vector and receiver polarization vectors are given by:

$$E_{tx}(t) = A_{tx}(t) U_{tx} p_o E(t) e^{j\beta(t)}$$

$$q(t) = A_{rx}(t) U_{rx} q_o. \tag{4}$$

Then, (3) becomes:

$$x_{rx}(t) = q_o^H U_{rx}^T A_{rx}^T(t) A_{tx}(t) U_{tx} p_o E(t) e^{j\beta(t)} \tag{5}$$

In the JAPRAE system 1710 there are two orthogonal receive antennas 1802, with polarizations $q_{o1}$ and $q_{o2}$. Thus, the signal generated at the input of the dual polarized receiver 1806 is given by:

$$x_{rx}(t) = \begin{bmatrix} x_{rx1}(t) \\ x_{rx2}(t) \end{bmatrix} = \begin{bmatrix} q_{o1}^H U_{rx}^T A_{rx}^T(\phi_{rx}) A_{tx}(\phi_{tx}) U_{tx} p_o \\ q_{o2}^H U_{rx}^T A_{rx}^T(\phi_{rx}) A_{tx}(\phi_{tx}) U_{tx} p_o \end{bmatrix} \tag{6}$$

$$E(t) e^{j\beta(t)} = \begin{bmatrix} a_1 \\ a_2 \end{bmatrix} E(t) e^{j\beta(t)} = a E(t) e^{j\beta(t)}$$

In equation (6) the transformations are explicitly represented as rotations of the transmitter $\phi_{tx}$ and receiver $\phi_{rx}$ around the line of sight. In the case where the transmit antenna 1804 and the receive antennas 1802 are linearly polarized, it can be shown that this reduces to the following form:

$$x_{rx}(t) = \begin{bmatrix} \cos(\phi_{tx} - \phi_{rx}) \\ -\sin(\phi_{tx} - \phi_{rx}) \end{bmatrix} E(t) e^{j\beta(t)} = \begin{bmatrix} \cos(\delta) \\ -\sin(\delta) \end{bmatrix} E(t) e^{j\beta(t)} \tag{7}$$

Consider a signal y(t) generated by performing a rotation on the vector x(t).

$$y_{rx}(t) = \begin{bmatrix} y_{rx1}(t) \\ y_{rx2}(t) \end{bmatrix} = \begin{bmatrix} \cos(\hat{\delta}) & -\sin(\hat{\delta}) \\ \sin(\hat{\delta}) & \cos(\hat{\delta}) \end{bmatrix} \begin{bmatrix} \cos(\delta) \\ -\sin(\delta) \end{bmatrix} \tag{8}$$

$$E(t) e^{j\beta(t)} = \begin{bmatrix} \cos(\hat{\delta})\cos(\delta) + \sin(\hat{\delta})\sin(\delta) \\ \sin(\hat{\delta})\cos(\delta) - \cos(\hat{\delta})\sin(\delta) \end{bmatrix}$$

$$E(t) e^{j\beta(t)} = \begin{bmatrix} \cos(\hat{\delta} - \delta) \\ \sin(\hat{\delta} - \delta) \end{bmatrix} E(t) e^{j\beta(t)}$$

Note that if $\hat{\delta} = \delta$, $y_{rx1} = Ee^{j\beta(t)}$ and $y_{rx0} = 0$. This amounts to a case where $y_{rx1}$ is the output of a beamformer that matches the polarization of the incident signal to maximize the receive signal power. It can be shown that this also maximizes the signal-to-noise ratio.

Now form the ratio of y2(k) to y1(k)

$$r(t) = \frac{y_{rx2}(t)}{y_{rx1}(t)} \tag{9}$$

$$= \frac{\sin(\hat{\delta} - \delta) E(t) e^{j\beta(t)}}{\cos(\hat{\delta} - \delta) E(t) e^{j\beta(t)}}$$

$$= \tan(\hat{\delta} - \delta)$$

$$= \tan(\hat{\delta} - \delta)$$

This forms the basis for generating an error signal for an adaptive polarization loop.

$$e_\delta(t) = \hat{\delta}(t) - \delta(t) = \tan^{-1}\left(\frac{y_2(t)}{y_1(t)}\right) \tag{10}$$

Figure 19:
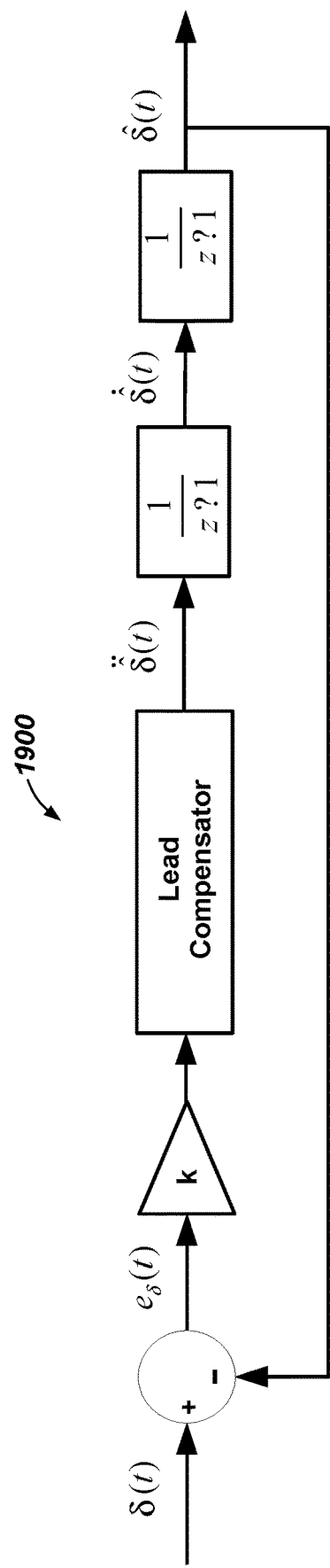
FIG. 19 illustrates the JAPRAE algorithm in the form of a conventional servo loop.

FIG. 19 illustrates the JAPRAE algorithm 1710 (FIG. 17) in the form of a conventional servo loop 1900. The closed loop may force $y_{rx2}$ to zero, hence $\hat{\delta} \to \delta$. Under closed loop conditions, the KV 400 roll angle is estimated by:

$$\hat{\theta}_{rx}(t) = \hat{\theta}_{tx}(t) - \hat{\delta}(t) \tag{11}$$

The transmitter roll angle, $\hat{\phi}_{tx}$, can be transmitted to the KV 400 via the data link 1806.

Figure 20:
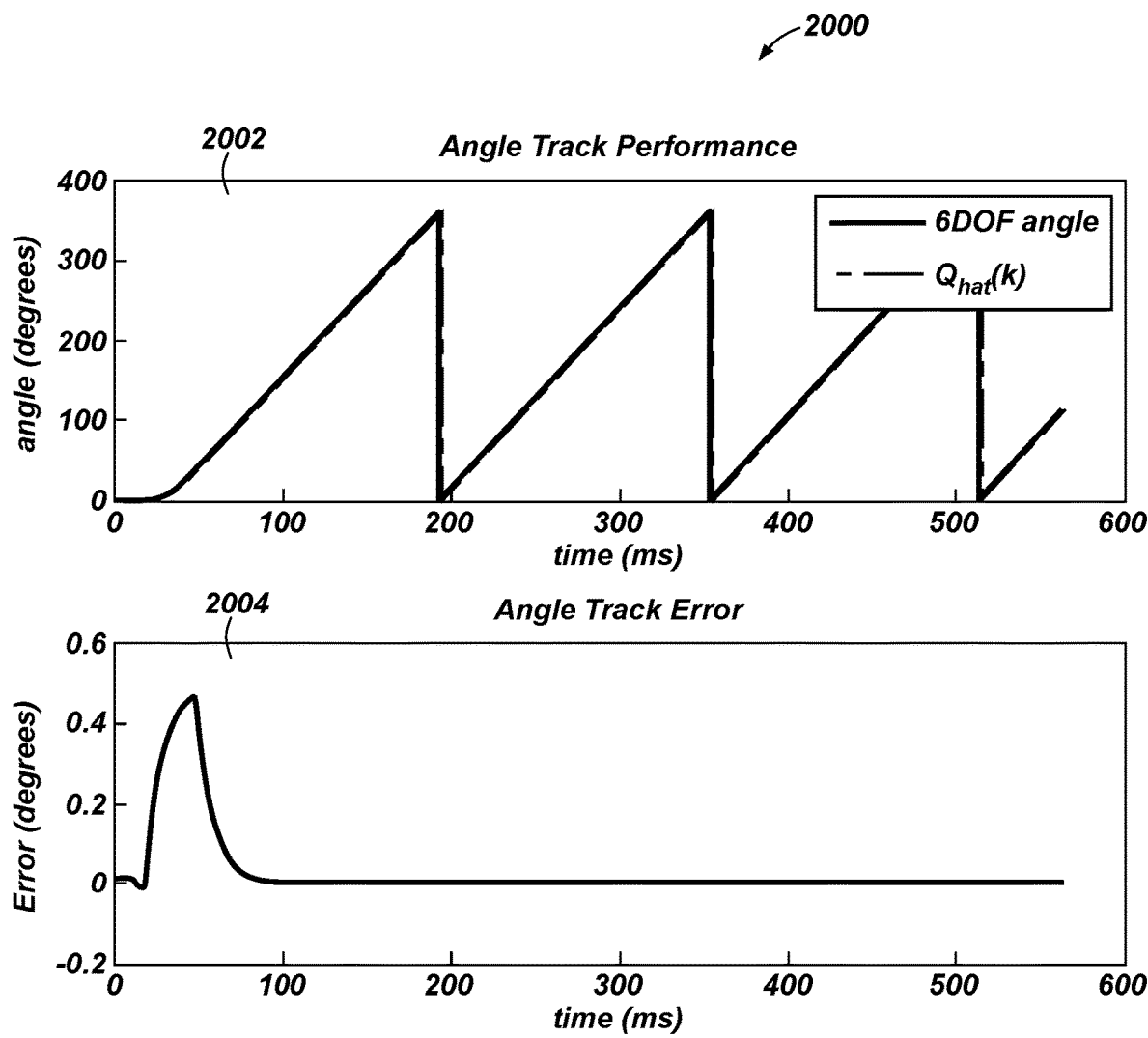
FIG. 20 illustrates a non-limiting example of a set of simulation results of the JAPRAE algorithm of FIGS. 18 and 19.

FIG. 20 illustrates a non-limiting example of a set of simulation results 2000 of the JAPRAE algorithm 1710 (FIG. 17) tracking the roll angle of a KV 400 body spinning on its longitudinal axis 1520 (FIG. 15) at 2200 degrees per second. A top plot 2002 of FIG. 20 illustrates an overlay of true and estimated roll angles. A bottom plot 2004 illustrates a difference or error between the overlay of true and estimated roll angles. The set of simulation results 2000 are shown without additive noise and illustrate the performance of the servo loop 1900 (FIG. 19).

Note that the solution for equation 10 is ambiguous by $\pi$ radians. Therefore, the loop 1900 of FIG. 19 should be initialized near the correct angle to avoid the ambiguity.

A Kalman filter methodology is used to fuse the sensor data. The translational motion involves a set of linear equations and the conventional Kalman filter (KF) can be used, whereas the rotational motion involves a set of non-linear equations and the conventional extended Kalman filter (EKF) can be used.

A 9×1 discrete time translational motion state vector, x(k), includes 3-D spatial components comprising a position vector, d(k), a velocity vector, v(k), and an acceleration vector, a(k), as follows:

$$x(k) = [d^T(k), v^T(k), a^T(k)]^T \tag{12}$$

Transition and measurement equations include a transition matrix, $F_k$, a plant noise coupling matrix, $G_k$, a measurement matrix, $H_k$, state transition noise $w_k$ and measurement noise $v_k$.

$$x_{k+1} = F x_k + G_k w_k$$

$$z_k = H_k x_k + v_k \tag{13}$$

The state transition noise $w_k$ is i.i.d. zero mean Gaussian with covariance $R_k$, and the measurement noise $v_k$ is also i.i.d. zero mean Gaussian with covariance $Q_k$. The subscript k indicates the variables might be time varying.

The expanded form of these equations is given by:

$$\begin{bmatrix} d_{k+1} \\ v_{k+1} \\ a_{k+1} \end{bmatrix} = \begin{bmatrix} I_3 & T_s I_3 & 0.5 T_s^2 I_3 \\ 0_3 & I_3 & T_s I_3 \\ 0_3 & 0_3 & I_3 \end{bmatrix} \begin{bmatrix} 0.5 T_s^2 I_3 \\ T_s I_3 \\ I_3 \end{bmatrix} \begin{bmatrix} w_{d,k} \\ w_{v,k} \\ w_{wa,k} \end{bmatrix} \tag{14}$$

$$\begin{bmatrix} z_{d,k} \\ z_{v,k} \\ z_{a,k} \end{bmatrix} = \begin{bmatrix} I_3 & 0_3 & 0_3 \\ 0_3 & I_3 & 0_3 \\ 0_3 & 0_3 & I_3 \end{bmatrix} \begin{bmatrix} d_k \\ v_k \\ a_k \end{bmatrix} + \begin{bmatrix} v_{d,k} \\ v_{v,k} \\ v_{a,k} \end{bmatrix}$$

where $T_s$ is the sample interval and $I_3$ and $0_3$ are 3×3 unity and zero matrices, respectively.

The Kalman filter 1720 (FIG. 17) involves two acts: the projection act and the update act.

The projection act is given by:

$$\hat{x}_{k|k+1} = F_k \hat{x}_{k-1|k-1}$$

$$\hat{P}_{k|K+1} = F_k \hat{P}_{k-1|k-1} F_k^T + G_k Q_k G_k^T \quad (15)$$

The update act is given by:

$$L_k = \hat{P}_{k|k-1} H_k^T [H_k \hat{P}_{k|k-1} H_k^T + R_k]^{-1}$$

$$\hat{x}_{k|k} = F \hat{x}_{k|k-1} + L_k [z_k - H_k \hat{x}_{k|k-1}]$$

$$\hat{P}_{k|k} = \hat{P}_{k|k-1} - \hat{P}_{k|k-1} H_k^T [H_k \hat{P}_{k|k-1} H_k^T + R_k]^{-1} H_k^T \hat{P}_{k|k-1}^T \quad (16)$$

The 9×1 discrete time translational motion state vector, $\bar{x}(k)$ comprises 3-D spatial components including attitude, $\theta(k)$, and angle rate, $\omega(k)$. An overbar is used to distinguish the rotational variables from the translational variables:

$$\bar{x}(k) = [\theta^T(k), \omega^T(k)]^T \quad (17)$$

The transition and measurement equations have a similar form as the translational equations except the transition equation is nonlinear.

$$\bar{x}_{k+1} = \bar{F}_k(y_k) + \bar{G}_k \bar{w}_k$$

$$\bar{z}_{k+1} = \bar{H}_k y_k + \bar{v}_k \quad (18)$$

The transition noise, $\bar{w}_k$ is i.i.d. zero mean Gaussian with covariance $\bar{R}_k$ and the measurement noise $\bar{v}_k$ is i.i.d. Gaussian with covariance $\bar{Q}_k$. The nonlinear property is shown in the expanded form.

$$\begin{bmatrix} \bar{x}_{\theta,k+1} \\ \bar{x}_{\omega,k+1} \end{bmatrix} = \begin{bmatrix} I_3 & T_s B(\theta_k) \\ 0_3 & I_3 \end{bmatrix} \begin{bmatrix} \bar{x}_{\theta,k} \\ \bar{x}_{\omega,k} \end{bmatrix} + \begin{bmatrix} 0_3 \\ I_3 \end{bmatrix} \begin{bmatrix} \bar{w}_{\theta,k} \\ \bar{w}_{\omega,k} \end{bmatrix} \quad (19)$$

$$\begin{bmatrix} \bar{z}_{\phi,k} \\ \bar{z}_{\omega,k} \end{bmatrix} = \begin{bmatrix} 1 & 0 & 0 & 0 & 0 & 0 \\ & & & 0_3 & & I_3 \end{bmatrix} \begin{bmatrix} \bar{x}_{\theta,k} \\ \bar{x}_{\omega,k} \end{bmatrix} + \begin{bmatrix} \bar{v}_{\phi,k} \\ \bar{v}_{\omega,k} \end{bmatrix}$$

The nonlinear matrix $B(\theta_k)$ converts angle rate to Euler angle rate and is given by:

$$B(\theta_k) = \begin{bmatrix} 1 & \sin(\phi)\tan(\theta) & \cos(\phi)\tan(\theta) \\ 0 & \cos(\phi) & -\sin(\phi) \\ 0 & \sin(\phi)\sec(\theta) & \cos(\phi)\sec(\theta) \end{bmatrix} \quad (20)$$

The EKF method is similar to the KF method except the transition equation is linearized using the Jacobian.

$$F_k = \frac{\partial \bar{F}_k(y_k)}{\partial \bar{x}_k} = \begin{bmatrix} \frac{\partial \bar{F}_k(y_k)}{\partial \theta} & \frac{\partial \bar{F}_k(y_k)}{\partial \omega} \end{bmatrix} \quad (21)$$

The two derivatives are:

From this point on, the EKF method is similar to the KV method using the linearized components.

The projection step for the EKF is given by:

$$\bar{x}_{k|k+1} = \bar{F}_k \bar{x}_{k-1|k-1}$$

$$\bar{P}_{k|k+1} = F_k \bar{P}_{k-1|k-1} F_k^T + G_k Q_k G_k^T \quad (22)$$

The update step for the EKF is given by:

$$L_k = \bar{P}_{k|k-1} H_k^T [H_k \bar{P}_{k|k-1} H_k^T + R_k]^{-1}$$

$$\bar{x}_{k|k} = F \bar{x}_{k|k-1} + L_k [z_k - H_k \bar{x}_{k|k-1}]$$

$$\bar{P}_{k|k} = \bar{P}_{k|k-1} - \bar{P}_{k|k-1} H_k^T [H_k \bar{P}_{k|k-1} H_k^T + R_k]^{-1} H_k^T \bar{P}_{k|k-1}^T \quad (23)$$

Figure 21:
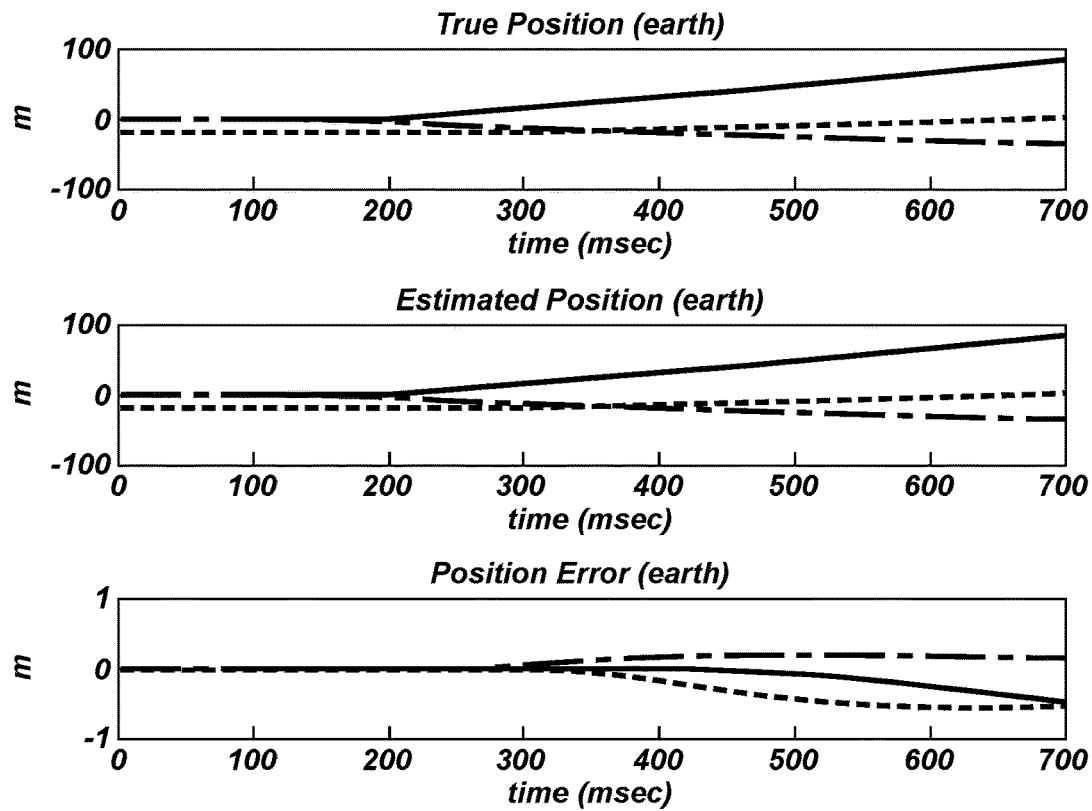
FIG. 21 illustrates a set of position results of an extended Kalman filter (EKF) fusion algorithm simulation.
Figure 22:
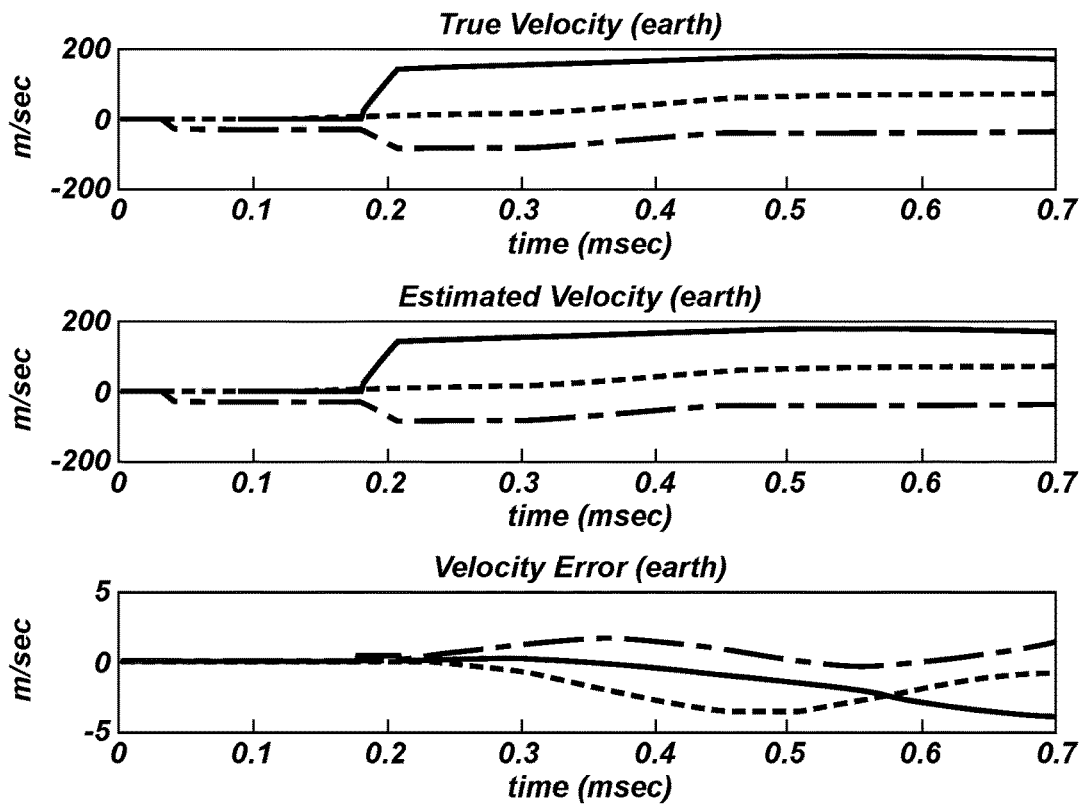
FIG. 22 illustrates a set of velocity results of the EKF fusion algorithm simulation of FIG. 21.
Figure 23:
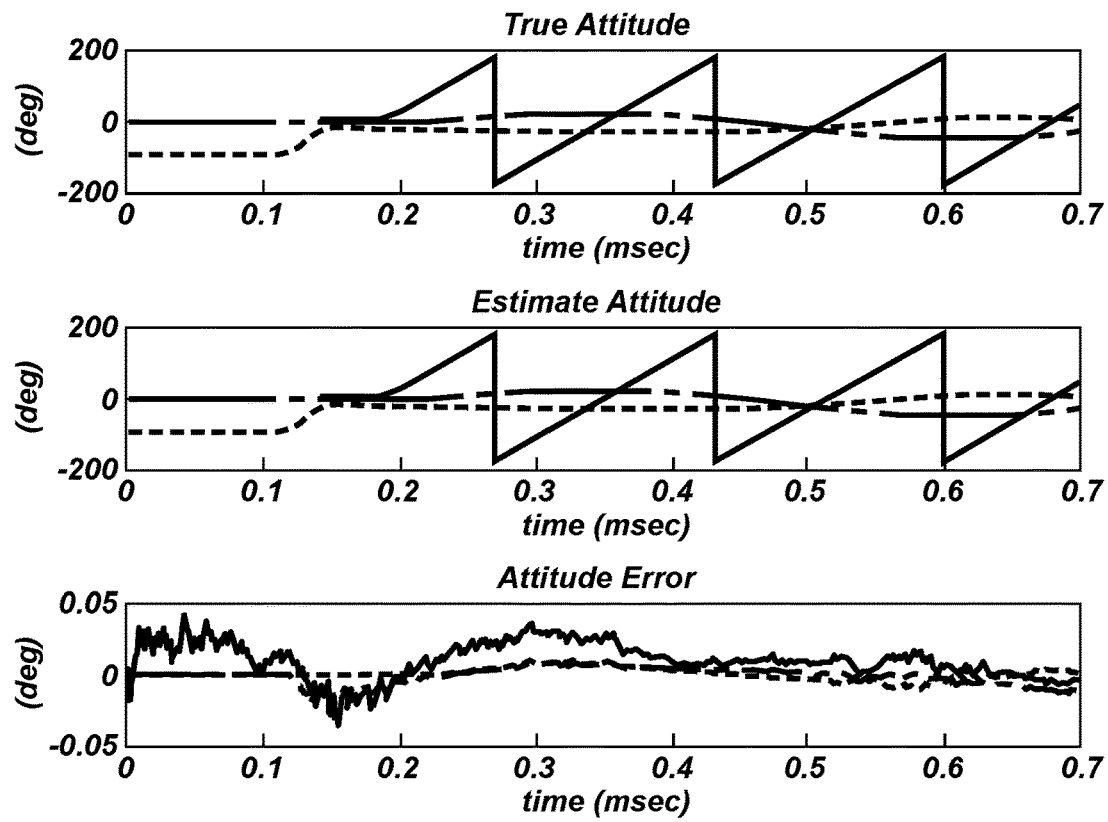
FIG. 23 illustrates a set of attitude results of the EKF fusion algorithm simulation of FIG. 21.

FIGS. 21, 22, and 23 illustrate sets of simulation results of the EKF fusion algorithm using the EMM 900 radar, JAPRAE 1710 and IMU 1714 (FIG. 17) inputs for a typical KV 400 flight profile. FIG. 21 illustrates position results of the simulation. A top plot illustrates true position values, a middle plot illustrates estimated position values, and a bottom plot illustrates position error. An x position is indicated by solid lines or blue lines, a y position is indicated by dotted lines or green lines, and a z position is indicated by dashed lines or red lines.

FIG. 22 illustrates velocity results of the simulation. A top plot illustrates true velocity values, a middle plot illustrates estimated velocity values, and a bottom plot illustrates velocity error. An x velocity is indicated by solid lines or blue lines, a y velocity is indicated by dotted lines or green lines, and a z velocity is indicated by dashed lines or red lines.

FIG. 23 illustrates attitude results of the simulation. A top plot illustrates true attitude values, a middle plot illustrates estimated attitude values, and a bottom plot illustrates attitude error. An x attitude is indicated by solid lines or blue lines, a y attitude is indicated by dotted lines or green lines, and a z attitude is indicated by dashed lines or red lines.

Figure 24:
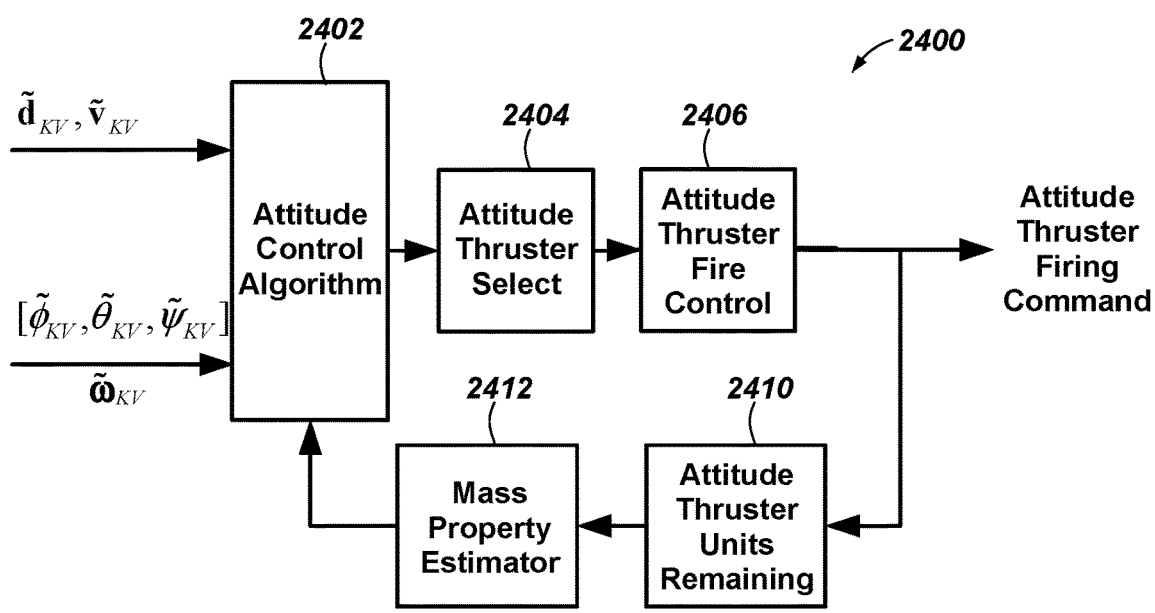
FIG. 24 illustrates an attitude control loop.

FIG. 24 illustrates an attitude control loop 2400. The attitude control loop 2400 utilizes an uplink and onboard EKF outputs to compute firing commands to the plurality of attitude control thrusters (ACT) 1604 to maintain the KV 400 body axis 1520 aligned with the velocity vector V (FIG. 15).

In FIG. 24, $\tilde{d}_{KV}$ and $\tilde{v}_{KV}$ are projectile position and velocity vectors in the north-east-down (NED) frame. $[\tilde{\phi}_{KV}, \tilde{\theta}_{KV}, \tilde{\psi}_{KV}]$ are body Euler angles and $\tilde{\omega}_{KV}$ is body rate vector. The projectile mass, CG location and inertia tensor are updated whenever there is a divert thruster 610 or an attitude control thruster 1604 firing. The attitude control loop 2400 may include an attitude control algorithm 2402. The attitude control algorithm 2402 may compute how much attitude control thrust is needed at the attitude thruster station 620 and which direction the thrust centroid should point to. If the attitude control thrust (ACT) exceeds a certain fraction of the ACT force, then the algorithm may initiate a command to fire an ACT. The attitude thruster select function 2404 then searches for an ACT to fire at operational block 2404.

$$\frac{\partial \bar{F}_k(y_k)}{\partial \theta} = \begin{bmatrix} 1 + T_s(\cos(\phi)\tan(\theta)\omega_{y,k} - \sin(\phi)\tan(\theta)\omega_{z,k}) & T_s(\sin(\phi)\sec^2(\theta)\omega_{y,k} + \cos(\phi)\sec^2(\theta)\omega_{z,k}) & 0 \\ -T_s\sin(\phi)\omega_{y,k} - T_s\cos(\phi)\omega_{z,k} & 1 & 0 \\ T_s(\cos(\phi)\sec(\theta)\omega_{y,k} - \sin(\phi)\sec(\theta)\omega_{z,k}) & (\sin(\phi)\sec(\theta)\tan(\theta)\omega_{y,k} + \cos(\phi)\sec(\theta)\tan(\theta)\omega_{z,k}) & 1 \end{bmatrix}$$

$$\frac{\partial \bar{F}_k(y_k)}{\partial \omega} = T_s B(\theta_k)$$

If the selected ACT is at the desired ignition position, the attitude thruster fire control 2406 electronics squib the selected ACT to fire at operational block 2406. Otherwise, the process exits the control loop. Finally, the attitude thruster units remaining function 2410 keeps track of which ACTs are spent and which are available for use. This information is fed back to the mass property estimator function 2412 and the attitude thruster select function 2404.

Operation may be as explained in acts 1 through 12 below:

Act 1: The onboard EKF algorithm tracks the projectile yaw ($\tilde{\psi}_{KV}$), pitch ($\tilde{\theta}_{KV}$) and roll ($\tilde{\phi}_{KV}$) attitude angles. These angles are used to compute the NED to body directional cosine matrix $C_n^b$ as $$C_n^b = \begin{bmatrix} 1 & 0 & 0 \\ 0 & \cos\tilde{\phi}_{KV} & \sin\tilde{\phi}_{KV} \\ 0 & -\sin\tilde{\phi}_{KV} & \cos\tilde{\phi}_{KV} \end{bmatrix} \circ \begin{bmatrix} \cos\tilde{\theta}_{KV} & 0 & -\sin\tilde{\theta}_{KV} \\ 0 & 1 & 0 \\ \sin\tilde{\theta}_{KV} & 0 & \cos\tilde{\theta}_{KV} \end{bmatrix} \cdot \begin{bmatrix} \cos\tilde{\psi}_{KV} & \sin\tilde{\psi}_{KV} & 0 \\ -\sin\tilde{\psi}_{KV} & \cos\tilde{\psi}_{KV} & 0 \\ 0 & 0 & 1 \end{bmatrix} \quad (24)$$

Act 2: The projectile velocity in the NED frame, $V_{KV}$, is tracked by EMM 900 radar and uplinked to the projectile via RF communication links. The velocity is then transformed into the body frame.

$$\tilde{V}_{KV}^b = C_n^b \cdot \tilde{V}_{KV} \quad (25)$$

Act 3: The total angle of attack $\alpha_{total}$ and aerodynamic roll angles $\phi_{aero}$ is then computed. The total angle of attack should be small at all times. The aerodynamic angle tells where the total angle of attack is relative to the body roll axis.

$$\alpha_{total} = \tan^{-1}\left(\frac{\sqrt{\tilde{V}_{KV}^b(2)^2 + \tilde{V}_{KV}^b(3)^2}}{\tilde{V}_{KV}^b(1)}\right) \quad (26)$$

$$\varphi_{aero} = \tan^{-1}\left(\frac{\tilde{V}_{KV}^b(2)}{\tilde{V}_{KV}^b(3)}\right)$$

Act 4: The attitude changing rate cannot be measured for the purpose of rate feedback, but the synthetic rates may be derived by using the relationship between the attitude rate and the estimated body rates and attitude angles as $$\dot{\tilde{\psi}}_{KV} = (\tilde{\omega}_{KV}(2)\sin\tilde{\phi}_{KV} + \tilde{\omega}_{KV}(3)\cos\tilde{\phi}_{KV})\sec\tilde{\theta}_{KV}$$

$$\dot{\tilde{\theta}}_{KV} = \tilde{\omega}_{KV}(2)\cos\tilde{\phi}_{KV} - \tilde{\omega}_{KV}(3)\sin\tilde{\phi}_{KV}$$

$$\dot{\tilde{\phi}}_{KV} = \tilde{\omega}_{KV}(1) + \dot{\tilde{\psi}}_{KV}\sin\tilde{\theta}_{KV} \quad (27)$$

Act 5: Compute the KV 400 heading and flight path angles in the NED frame. These are the desired body yaw and pitch attitude angles that we want to control. Note that the body roll angle is free.

$$\psi_{cmd} = \tan^{-1}\left(\frac{\tilde{V}_{KV}(2)}{\tilde{V}_{KV}(1)}\right) \quad (28)$$

$$\theta_{cmd} = \tan^{-1}\left(\frac{-\tilde{V}_{KV}(3)}{\sqrt{\tilde{V}_{KV}(1)^2 + \tilde{V}_{KV}(2)^2}}\right)$$

Act 6: Compute attitude error by subtracting the estimated attitude angles from the commanded attitude angles above. This error is then multiplied by a proportional gain $K_{p,outer}$ to form attitude angle rate command.

$$\dot{\psi}_{cmd} = K_{p,outer}(\psi_{cmd} - \tilde{\psi}_{KV})$$

$$\dot{\theta}_{cmd} = K_{p,outer}(\theta_{cmd} - \tilde{\theta}_{KV}) \quad (29)$$

Act 7: Compute attitude rate errors by subtracting the attitude rate derived in Act 4 above from the rate commands above. These rate errors are multiplied by a proportional gain $K_{p,inner}$ to form attitude acceleration commands.

$$\ddot{\psi}_{cmd} = K_{p,inner}(\dot{\psi}_{cmd} - \dot{\tilde{\psi}}_{KV})$$

$$\ddot{\theta}_{cmd} = K_{p,inner}(\dot{\theta}_{cmd} - \dot{\tilde{\theta}}_{KV}) \quad (30)$$

Figure 25:
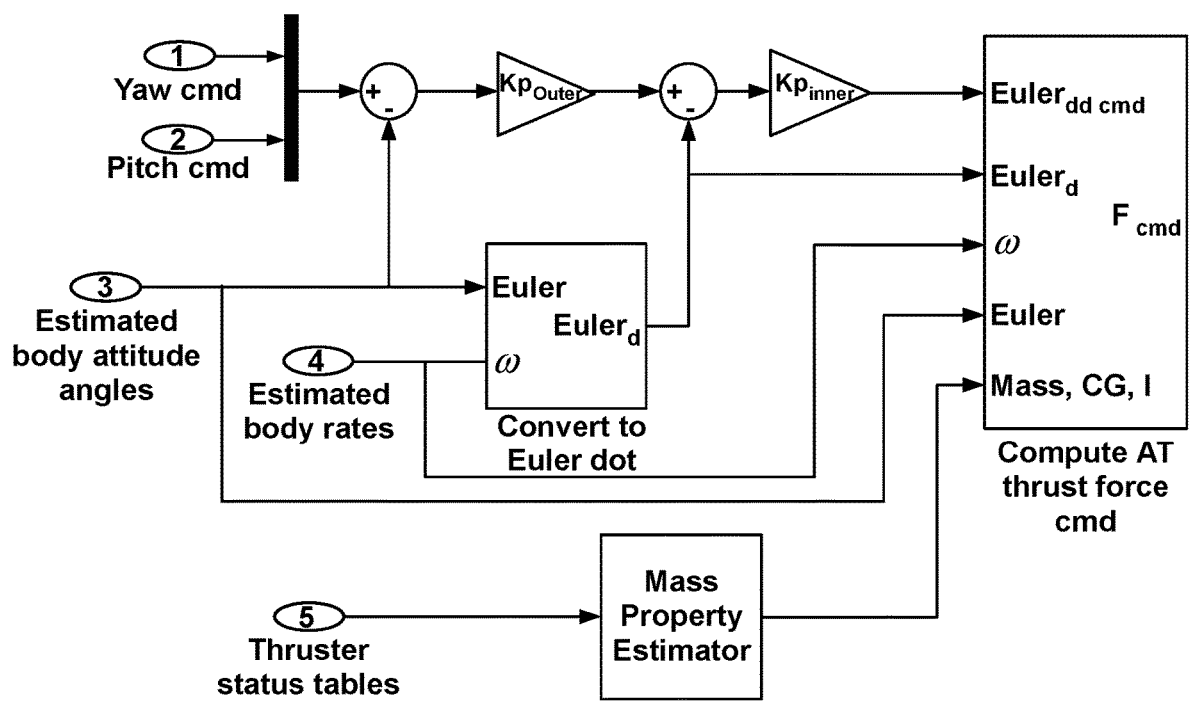
FIG. 25 illustrates a controller input-output topology.

FIG. 25 illustrates a controller input-output topology. The yaw and pitch commands are derived from Act 5. The estimated body attitude angles, Euler, and body rates, $\omega$, are provided by the JAPRAE algorithm 1710. The controller gain $Kp_{outer}$ and $Kp_{inner}$ are to be optimized for various engagement scenarios. The symbol $Euler_d$ represents the Euler rate vector $[\dot{\tilde{\psi}}_{KV}, \dot{\tilde{\theta}}_{KV}, \dot{\tilde{\phi}}_{KV}]$. $Euler_{dd}$ represents the Euler acceleration vector $[\ddot{\tilde{\psi}}_{KV}, \ddot{\tilde{\theta}}_{KV}, \ddot{\tilde{\phi}}_{KV}]$. $F_{cmd}$ is the output of the controller containing the magnitude of the attitude thrust force command and its orientation relative to the body roll axis 1520. The function that computes the force command is described in Acts 8 through 10.

Act 8: Because the air vehicle is aerodynamically unstable at all flight regimes, angle of attack will grow if unchecked. For this reason, the aerodynamic moment to be countered must be estimated, in addition to the moment needed to produce the attitude acceleration of Act 7. The estimation is done by storing a complete set of aerodynamic coefficient tables on board the projectile and computing the total yawing and pitching moments about the estimated CG location on the flight. The algorithm to estimate the KV 400 mass, CG location and inertia tensor will be described below with respect to FIG. 27. The total aerodynamic moment in the body frame, ignoring the rolling moment, may be computed as:

$$M^b = QSd\begin{Bmatrix} 0 \\ C_m \\ C_n \end{Bmatrix} \quad (31)$$

$$C_m = (\overline{X}_{CP} - \overline{X}_{CG}) * C_N + C_{m_q}\bar{q} + C_A \overline{Z}_{CG}$$

$$C_n = (\overline{X}_{CP} - \overline{X}_{CG}) * C_Y + C_{n_r}\bar{r} - C_A \overline{Y}_{CG}$$

Where:
Q is dynamic pressure
S is reference area
d is reference diameter
$C_m$ is total pitching moment coefficient
$C_n$ is total yawing moment coefficient
$\overline{X}_{CP}$ is normalized center of pressure location along the body x-axis $X_{CG}$ is normalized center of gravity location along the body x-axis
$Y_{CG}$ is CG offset from the body x-axis
$Z_{CG}$ is CG offset from the body x-axis
$C_A$ is axial drag-force coefficient
$C_N$ is normal force coefficient
$C_Y$ is lateral force coefficient
$C_{m_q}$ is pitch damping coefficient
$C_{n_r}$ is yaw damping coefficient
$\tilde{q}$ is normalized pitching rate
$\tilde{r}$ is normalized yawing rate.

Act 9: The instantaneous moment about the CG location required to produce the attitude acceleration which will force the body to align with the velocity vector V (FIG. 15) can now be calculated as:

$$M_{cmd} = \begin{bmatrix} 0 & 0 & 0 \\ 0 & -\sin\tilde{\phi}_{KV} & -\cos\tilde{\phi}_{KV} \\ 0 & -\cos\tilde{\phi}_{KV} & \sin\tilde{\phi}_{KV} \end{bmatrix} \begin{Bmatrix} 0 \\ c_2 \\ c_3 \end{Bmatrix} I_t. \quad (32)$$

$I_t$ is the estimated moment of inertia about the lateral axis and, $c_2$ and $c_3$ are computed as:

$c_2 = \cos\tilde{\theta}_{KV}\ddot{\psi}_{cmd} - \sin\tilde{\theta}_{KV}\dot{\theta}_{KV}\dot{\psi}_{KV} - (\dot{\omega}_{KV}(2)\cos\tilde{\phi}_{KV} - \omega_{KV}(3)\sin\tilde{\phi}_{KV})\dot{\psi}_{KV} - (I_t-I_a)(\omega_{KV}(1)\omega_{KV}(3)\sin\tilde{\phi}_{KV} + \omega_{KV}(1)\omega_{KV}(2)\cos\tilde{\phi}_{KV})$ $c_3 = \ddot{\theta}_{cmd} + (\dot{\omega}_{KV}(2)\sin\tilde{\phi}_{KV} + \dot{\omega}_{KV}(3)\cos\tilde{\phi}_{KV})\dot{\phi}_{KV} - (I_t-I_a)(\omega_{KV}(1)\omega_{KV}(3)\cos\tilde{\phi}_{KV} - \omega_{KV}(1)\omega_{KV}(2)\sin\tilde{\phi}_{KV})$ (33)

$I_a$ denotes the estimated moment of inertia about the roll axis.

Act 10: Given the estimated CG location, $X_{CG}$, and the attitude nozzle location, $X_{AT}$, we can convert the above moment command to thrust force command as:

$$F_{cmd} = \begin{Bmatrix} 0 \\ M_{cmd}(3) - M^b(3) \\ -M_{cmd}(2) + M^b(2) \end{Bmatrix} \frac{1}{X_{AT} - X_{CG}} \quad (34)$$

The magnitude of this command is:

$$F_{total} = \|F_{cmd}\| \quad (35)$$

And, the roll orientation relative to the body y-axis is:

$$\phi_{cmd} = \tan^{-1}\left(\frac{F_{cmd}(3)}{F_{cmd}(2)}\right) \quad (36)$$

Act 11: if the thrust force command, $F_{total}$, is greater than a threshold value, usually a fraction of the attitude thruster force, a thruster search algorithm may be initiated to find a thruster to fire. Otherwise, no attitude thruster may be fired.

Figure 26:
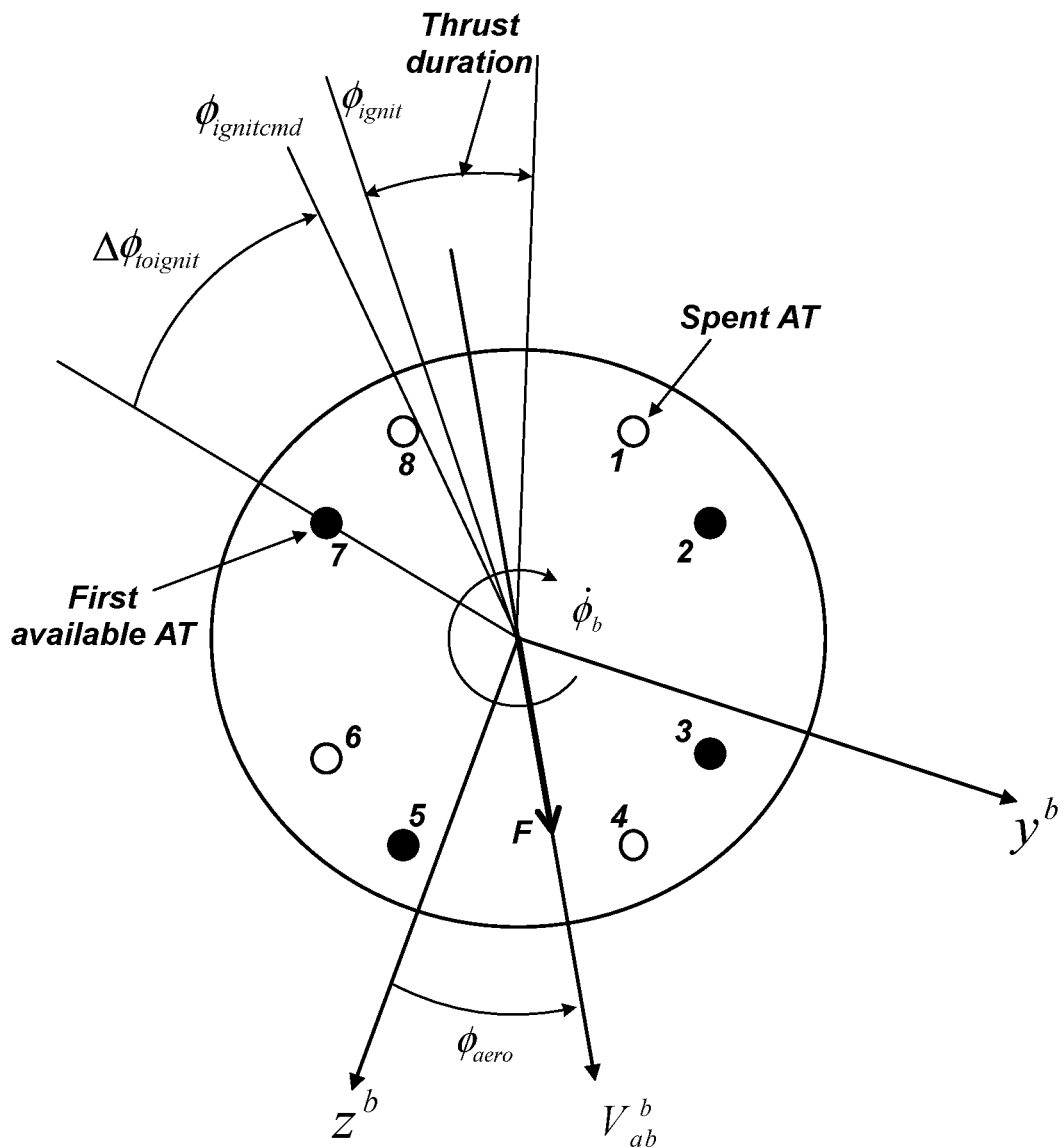
FIG. 26 illustrates an example of a search procedure that may be used to find a thruster to fire.

FIG. 26 illustrates an example of a search procedure that may be used to find a thruster to fire. A plurality of attitude thrusters 1, 2, 3, 4, 5, 6, 7, and 8 are shown with circles. A white circle, such as attitude thrusters 1, 4, 6, and 8, indicates the attitude thruster has been spent. A shaded circle, such as attitude thrusters 2, 3, 5, and 7, indicates the attitude thruster has not been spent.

From Act 3, a total angle of attack is found between the body x-axis and the velocity vector $V^b$ and the aerodynamic angle relative to the body z-axis. To reduce the total angle of attack, an attitude thruster may be fired 180 degrees opposite to $\phi_{aero}$ such that the resultant force F pushes the body nose toward the velocity vector. Knowing the duration of the attitude thruster burn and time delays from the thruster command generation to actual thruster ignition, may enable calculation of the proper roll angle to issue the attitude thruster squib command. If there happens to be an attitude thruster at the right place at the moment, that thruster will be selected to fire. For example, in FIG. 26, attitude thruster number 8 is about to reach the ignition command position; but it has already been spent, so it cannot be selected. Thruster number 7 is available but it's too soon to be fired so it will not be selected, either. However, as the KV 400 precesses and nutates, the ignition command angle $\phi_{ignit,cmd}$ and thruster number 7 may line up and be selected to fire.

Act 12: The attitude control loop may keep track of which attitude thrusters are available to use in an availability list. When a certain attitude thruster is commanded to fire, it is removed from the availability list.

Because of the high mass ratio of the divert thruster 610 and the attitude control thruster 1604 propellants to the KV 400 total mass, the CG location and the inertia tensor will migrate as any divert thruster 610 or an attitude control thruster 1604 is firing. This is the so-called CG migration problem and it becomes more important toward the end of flight when most of the thrusters are spent.

Figure 27:
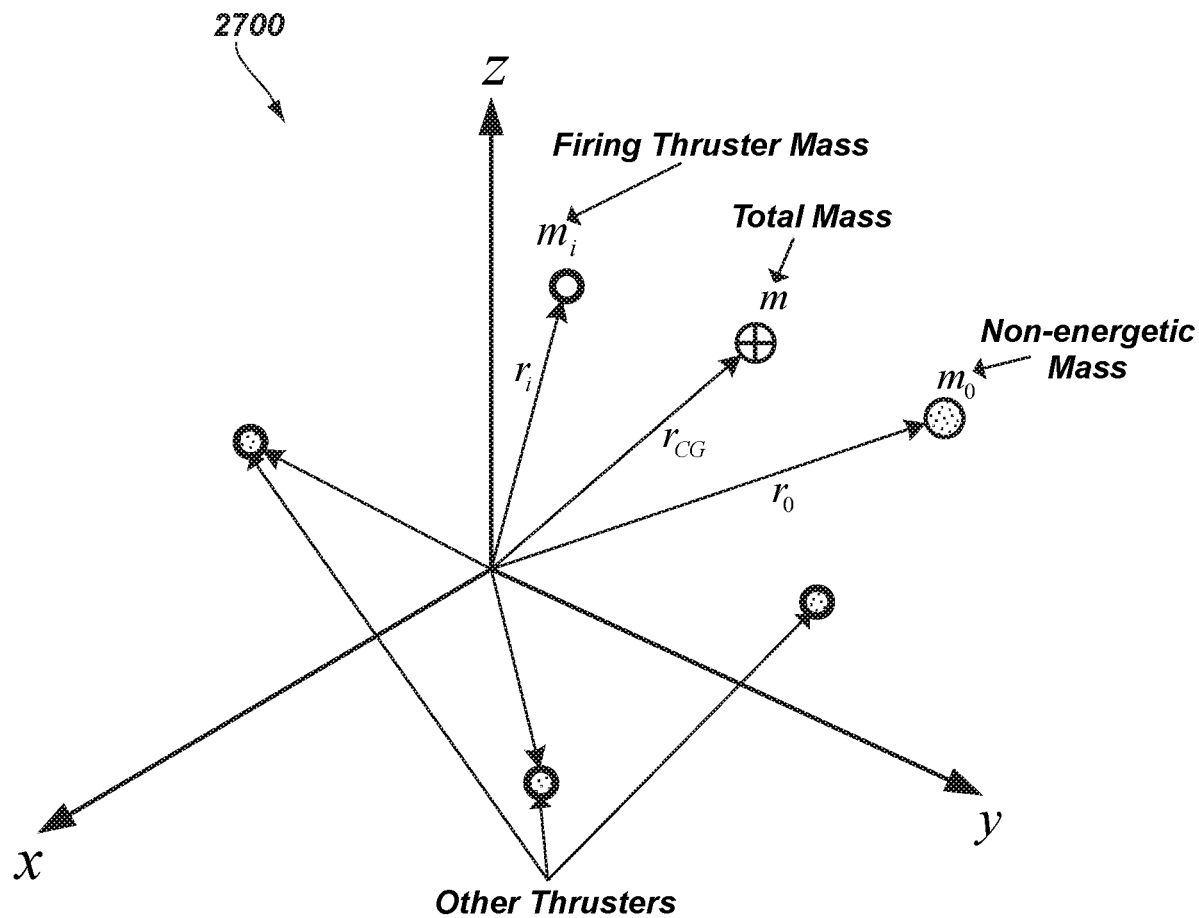
FIG. 27 illustrates a mass and center of gravity (CG) location update algorithm.

FIG. 27 illustrates a mass and CG location update algorithm 2700. The mass and CG location update algorithm 2700 may be configured to update the total mass, CG location and inertia tensor as a divert thruster 610 or attitude control thruster 1604 is firing. The definitions of the symbols are:

$\dot{m}_i \equiv i^{th}$ thruster mass burn rate <0

$r_i \equiv i^{th}$ thruster CG location $m \equiv$ total mass $r_{CG} \equiv$ Cg location $I_{xy} \equiv$ Inertia tensor element xy (37)

The following equations are computed recursively:

$$\Delta m_i = \dot{m}_i \cdot dt < 0 \quad (38)$$

$$m(t_k) = m(t_{k-1}) + \Delta m_i$$

$$r_{CG}(t) = \frac{m(t_{k-1})r_{CG}(t_{k-1}) + \Delta m_i r_i}{m(t_k)}$$

$$I_{xx}(t_k) = I_{xx}(t_{k-1}) - \sum \Delta m_i(y_i^2 + z_i^2)$$

$$I_{yy}(t_k) = I_{yy}(t_{k-1}) - \sum \Delta m_i(x_i^2 + z_i^2)$$

$$I_{zz}(t_k) = I_{zz}(t_{k-1}) - \sum \Delta m_i(x_i^2 + y_i^2)$$

$$I_{xy}(t_k) = I_{xy}(t_{k-1}) + \sum \Delta m_i x_i y_i$$

$$I_{xz}(t_k) = I_{xz}(t_{k-1}) + \sum \Delta m_i x_i z_i$$

$$I_{yz}(t_k) = I_{yz}(t_{k-1}) + \sum \Delta m_i y_i z_i$$

To a large extent, this detailed description has focused on a particular type of intercept vehicle (e.g., the eject vehicle 400). However, engagement management systems described herein may be used with many types of intercept vehicles 400 in which the engagement management system can track the intercept vehicle 400, alter the course of the intercept vehicle 400, determine when to detonate the intercept vehicle 400, or combinations thereof using commands communicated between the engagement management system and the intercept vehicle 400.

Moreover, while embodiments of the present disclosure may be particularly suitable for use on aerial platforms, they may also be used in other types of mobile platforms like ground-based mobile platforms such as, for example, tanks, armored personnel carriers, personnel carriers (e.g., Humvee and Stryker vehicles) and other mobile platforms capable of bearing embodiments of the present disclosure. Moreover, embodiments of the present disclosure may be used for relatively stationary ground-based personnel protection wherein a mobile platform may not be involved. Accordingly, embodiments of the disclosure are not limited to aerial applications.

While the present disclosure has been described herein with respect to certain illustrated embodiments, those of ordinary skill in the art will recognize and appreciate that the present invention is not so limited. Rather, many additions, deletions, and modifications to the illustrated and described embodiments may be made without departing from the scope of the invention as hereinafter claimed along with their legal equivalents. In addition, features from one embodiment may be combined with features of another embodiment while still being encompassed within the scope of the invention as contemplated by the inventor.

What is claimed is:

1. An active protection system, comprising:
   an aircraft;
   an intercept vehicle carried by the aircraft, the intercept vehicle comprising:
      a rocket motor for accelerating the intercept vehicle along a flight path of the intercept vehicle;
      alignment thrusters configured to perform a pitch maneuver by rotating the intercept vehicle about an axis orthogonal to the longitudinal axis of the intercept vehicle to at least substantially align the longitudinal axis of the intercept vehicle with an intercept vector prior to the rocket motor being fired to accelerate the intercept vehicle along the flight path of the intercept vehicle; and
      divert thrusters configured to divert the intercept vehicle in a direction transverse to the flight path of the intercept vehicle.

2. The active protection system of claim 1, wherein the intercept vehicle further comprises a nose thruster module proximate a front end of the intercept vehicle.

3. The active protection system of claim 2, wherein the nose thruster module of the intercept vehicle comprises the alignment thrusters.

4. The active protection system of claim 1, wherein the intercept vehicle further comprises:
   a controller; and
   one or more sensors operably coupled to the controller, wherein the controller is configured to initiate flight corrections to the intercept vehicle during flight based on feedback from the one or more sensors.

5. The active protection system of claim 4, further comprising a guidance system disposed on the aircraft configured to transmit guidance signals to the intercept vehicle to direct the intercept vehicle on the flight path of the intercept vehicle.

6. The active protection system of claim 5, further comprising a detection system disposed on the aircraft and comprising at least one sensor configured to detect aerial threats with threat range of the aircraft.

7. The active protection system of claim 6, wherein the detection system is further configured to track aerial threats detected by the at least one sensor.

8. The active protection system of claim 6, further comprising an intercept vehicle carrier for carrying the intercept vehicle.

9. A method of intercepting an aerial threat, comprising:
   causing an intercept vehicle to perform a first action of a launch sequence to leave a platform;
   causing the intercept vehicle to perform a second action of the launch sequence after the first launch sequence, the second action comprising performing a pitch maneuver with a plurality of pitch thrusters of the intercept vehicle to align the intercept vehicle along an intercept vector pointed substantially toward a projected intercept point with an identified aerial threat; and
   subsequent to the second action of the launch sequence, firing a rocket motor of the intercept vehicle to cause the intercept vehicle to accelerate along a flight path of the intercept vehicle.

10. The method of claim 9, wherein the first action of a launch sequence comprises releasing the intercept vehicle from the platform.

11. The method of claim 9, wherein the first action of a launch sequence comprises launching the intercept vehicle from the platform.

12. The method of claim 9, wherein the intercept vehicle is launched via a dispenser of the platform.

13. The method of claim 9, further comprising performing a divert maneuver with one or more divert thrusters of the intercept vehicle to divert the intercept vehicle from the intercept vector one or more times after commencement of accelerating the intercept vehicle.

14. The method of claim 9, further comprising causing the intercept vehicle to perform the second action of the launch sequence after the intercept vehicle has changed position relative to the platform by a particular distance.

15. The method of claim 9, wherein the first action of the launch sequence comprises releasing the intercept vehicle from a carrier disposed on the platform into air deflected by the platform.

16. The method of claim 9, further comprising initiating the first action of the launch sequence in response to identifying the aerial threat.

17. The method of claim 9, further comprising determining the intercept vector in response to identifying the aerial threat.

18. A method of intercepting an aerial threat, comprising:
   causing an intercept vehicle to exit a vicinity of an aerial platform, the intercept vehicle originally being coupled to the aerial platform;
   causing the intercept vehicle to perform a pitch maneuver with a plurality of pitch thrusters of the intercept vehicle to align the intercept vehicle along an intercept vector pointed substantially toward a projected intercept point with an identified aerial threat; and
   subsequent to causing the intercept vehicle to perform the pitch maneuver, firing a rocket motor of the intercept vehicle to cause the intercept vehicle to accelerate along a flight path of the intercept vehicle.

19. The method of claim 18, wherein causing the intercept vehicle to perform the pitch maneuver comprises transmitting at least one pitch command to the intercept vehicle.

20. The method of claim 19, further comprising transmitting at least one guidance command to the intercept vehicle during flight to perform a divert maneuver via one or more divert thrusters.

21. The method of claim 18, further comprising identifying the aerial threat as a potential threat to at least one object.

22. The method of claim 21, wherein the at least one object is one of the aerial platform, a ground vehicle, another aerial platform, or a ground structure.

* * * * *